US008236227B2

(12) United States Patent  
Batchelder et al.

(10) Patent No.: US 8,236,227 B2
(45) Date of Patent: Aug. 7, 2012

(54) METHOD FOR BUILDING THREE-DIMENSIONAL MODELS IN EXTRUSION-BASED DIGITAL MANUFACTURING SYSTEMS USING TRACKED FILAMENTS

(75) Inventors: J. Samuel Batchelder, Somers, NY (US); William J. Swanson, St. Paul, MN (US); S. Scott Crump, Wayzata, MN (US)

(73) Assignee: Stratasys, Inc., Eden Prairie, MN (US)

( * ) Notice: Subject to any disclaimer, the term of this patent is extended or adjusted under 35 U.S.C. 154(b) by 275 days.

(21) Appl. No.: 12/612,342

(22) Filed: Nov. 4, 2009

(65) Prior Publication Data

US 2011/0076495 A1 Mar. 31, 2011

Related U.S. Application Data

(60) Provisional application No. 61/247,078, filed on Sep. 30, 2009.

(51) Int. Cl.
B29C 41/02 (2006.01)
(52) U.S. Cl. ........................................................ 264/308
(58) Field of Classification Search ................... 264/308
See application file for complete search history.

(56) References Cited

U.S. PATENT DOCUMENTS

| | | | |
|---|---|---|---|
| 4,113,935 A | 9/1978 | Schippers et al. | |
| 4,749,347 A | 6/1988 | Valavaara | |
| 4,774,123 A | 9/1988 | Dziki | |
| 4,797,313 A | 1/1989 | Stolk et al. | |
| 5,121,329 A | 6/1992 | Crump | |
| 5,169,081 A | 12/1992 | Goedderz | |
| 5,220,774 A | 6/1993 | Harbeke et al. | |
| 5,303,141 A | 4/1994 | Batchelder et al. | |
| 5,312,224 A | 5/1994 | Batchelder et al. | |
| 5,340,433 A | 8/1994 | Crump | |
| 5,342,687 A | 8/1994 | Iwai et al. | |
| 5,503,785 A | 4/1996 | Crump et al. | |
| 5,738,817 A | 4/1998 | Danforth et al. | |
| 5,764,521 A | 6/1998 | Batchelder et al. | |
| 5,866,058 A | 2/1999 | Batchelder et al. | |
| 5,939,008 A | 8/1999 | Comb et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,054,077 A | 4/2000 | Comb et al. | |
| 6,067,480 A | 5/2000 | Stuffle et al. | |

(Continued)

FOREIGN PATENT DOCUMENTS

EP 1350773 A2 10/2003

(Continued)

OTHER PUBLICATIONS

International Search Report and Written Opinion dated Nov. 19, 2010 for corresponding International Application No. PCT/US2010/049609, filed Sep. 21, 2010.

(Continued)

*Primary Examiner* — Leo B Tentoni
(74) *Attorney, Agent, or Firm* — Brian R. Morrison; Westman, Champlin & Kelly, P.A.

(57) ABSTRACT

A consumable material for use in an extrusion-based digital manufacturing system, the consumable material comprising a topographical surface pattern that is configured to engage with a drive mechanism of the extrusion-based digital manufacturing system.

20 Claims, 16 Drawing Sheets

U.S. PATENT DOCUMENTS

| | | | |
|---|---|---|---|
| 6,070,107 | A | 5/2000 | Lombardi et al. |
| 6,085,957 | A | 7/2000 | Zinniel et al. |
| 6,129,872 | A | 10/2000 | Jang |
| 6,228,923 | B1 | 5/2001 | Lombardi et al. |
| 6,257,517 | B1 | 7/2001 | Babish et al. |
| 6,302,309 | B1 | 10/2001 | Drader |
| 6,547,995 | B1 | 4/2003 | Comb |
| 6,645,412 | B2 | 11/2003 | Priedeman, Jr. |
| 6,685,866 | B2 | 2/2004 | Swanson et al. |
| 6,722,872 | B1 | 4/2004 | Swanson et al. |
| 6,730,252 | B1 | 5/2004 | Teoh et al. |
| 6,749,414 | B1 | 6/2004 | Hanson et al. |
| 6,790,403 | B1 | 9/2004 | Priedeman, Jr. et al. |
| 6,814,907 | B1 | 11/2004 | Comb |
| 6,869,559 | B2 | 3/2005 | Hopkins |
| 6,923,634 | B2 | 8/2005 | Swanson et al. |
| 6,998,087 | B1 | 2/2006 | Hanson et al. |
| 7,122,246 | B2 | 10/2006 | Comb et al. |
| 7,172,715 | B2 | 2/2007 | Swanson et al. |
| 7,363,686 | B2 | 4/2008 | Fukuyasu et al. |
| 2005/0172501 | A1 | 8/2005 | Fogle |
| 2007/0003656 | A1 | 1/2007 | LaBosiee et al. |
| 2007/0228590 | A1 | 10/2007 | LaBossiere et al. |
| 2009/0035405 | A1 | 2/2009 | Leavitt |
| 2009/0263582 | A1 | 10/2009 | Batchelder |
| 2009/0273122 | A1 | 11/2009 | Batchelder |
| 2009/0274540 | A1 | 11/2009 | Batchelder |

FOREIGN PATENT DOCUMENTS

| | | |
|---|---|---|
| GB | 816016 | 7/1959 |
| GB | 2 291 003 A | 1/1996 |
| WO | 97/37810 | 10/1997 |
| WO | WO-2007130229 A2 * | 11/2007 |
| WO | 2009134298 A2 | 11/2009 |

OTHER PUBLICATIONS

Techspan Group, "Technical Data Sheet—Techspan Plastic Welding Rods", dated Dec. 31, 2007, retrieved from URL:http://www.techspanonline.com/data/media/documents/pdf/7.%20TechspanRodList2007.pdf, retrieved Nov. 4, 2010.

* cited by examiner

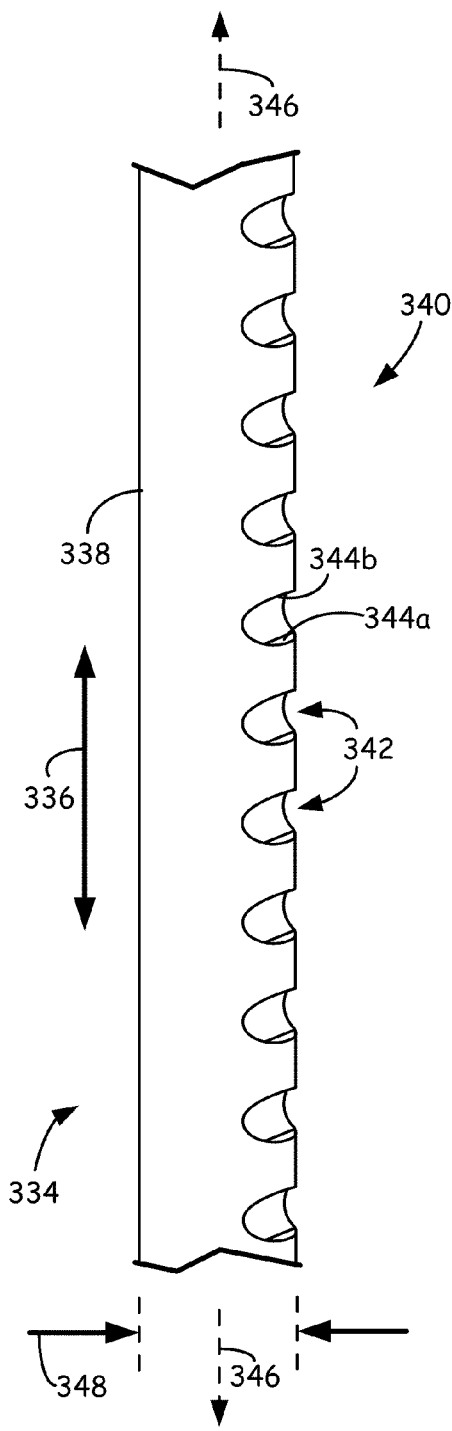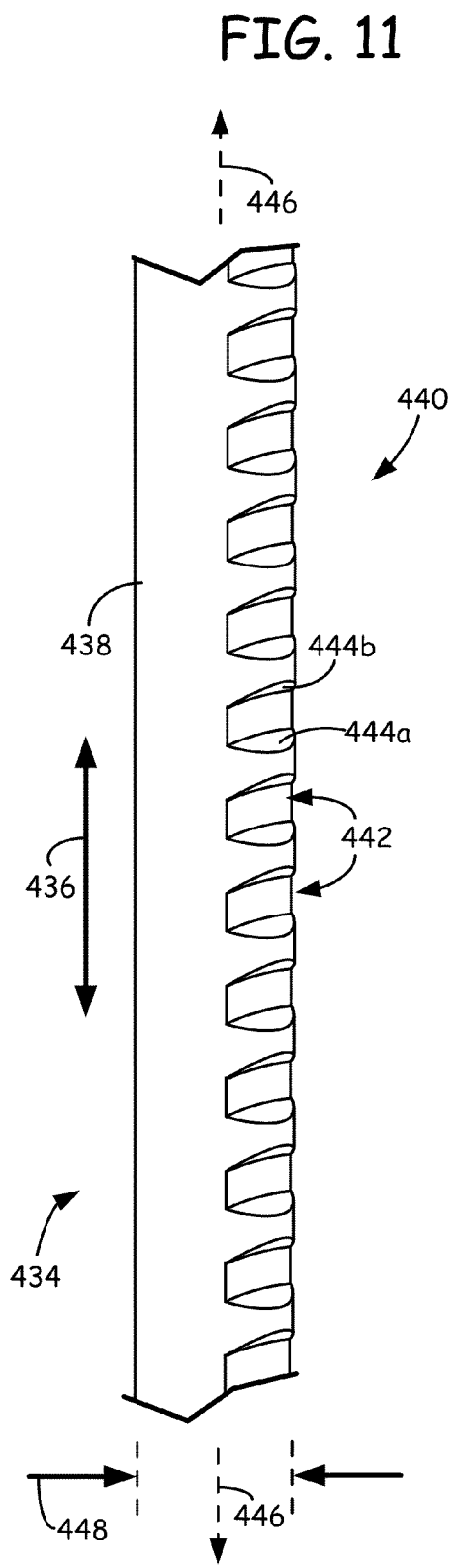
FIG. 10
FIG. 11

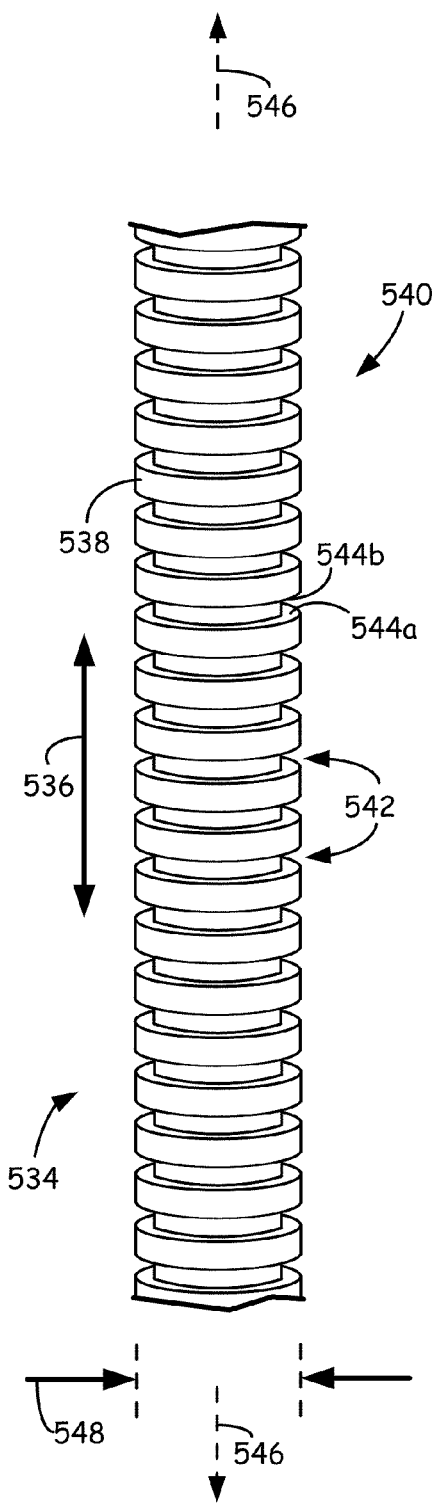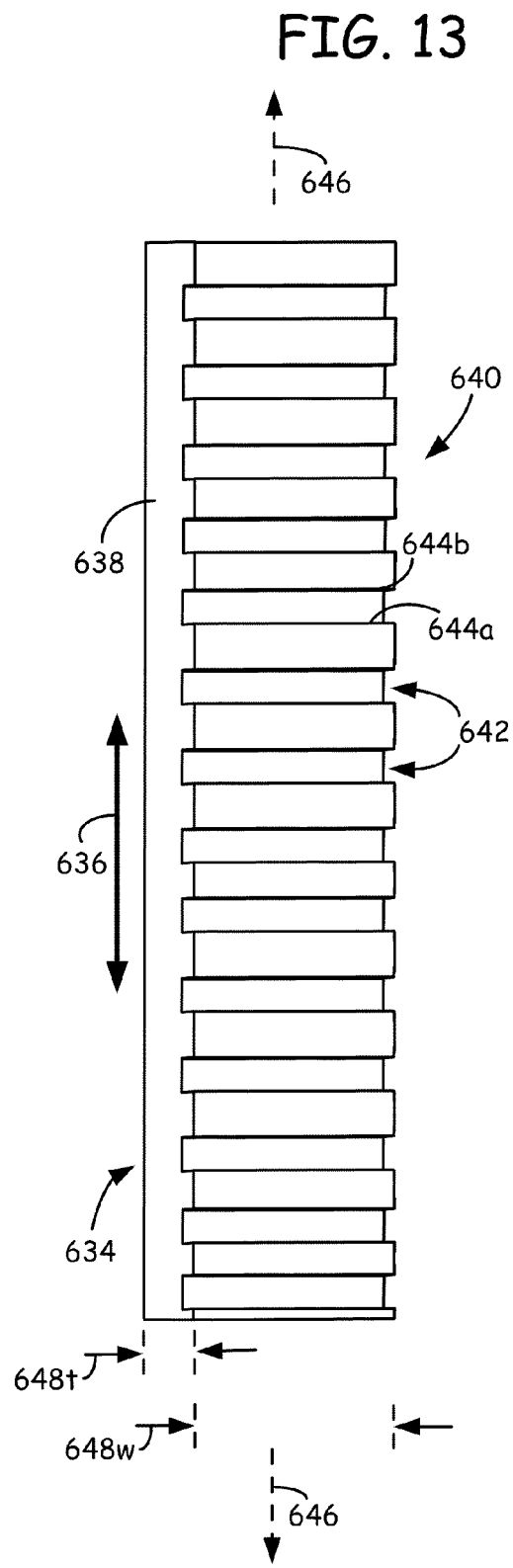

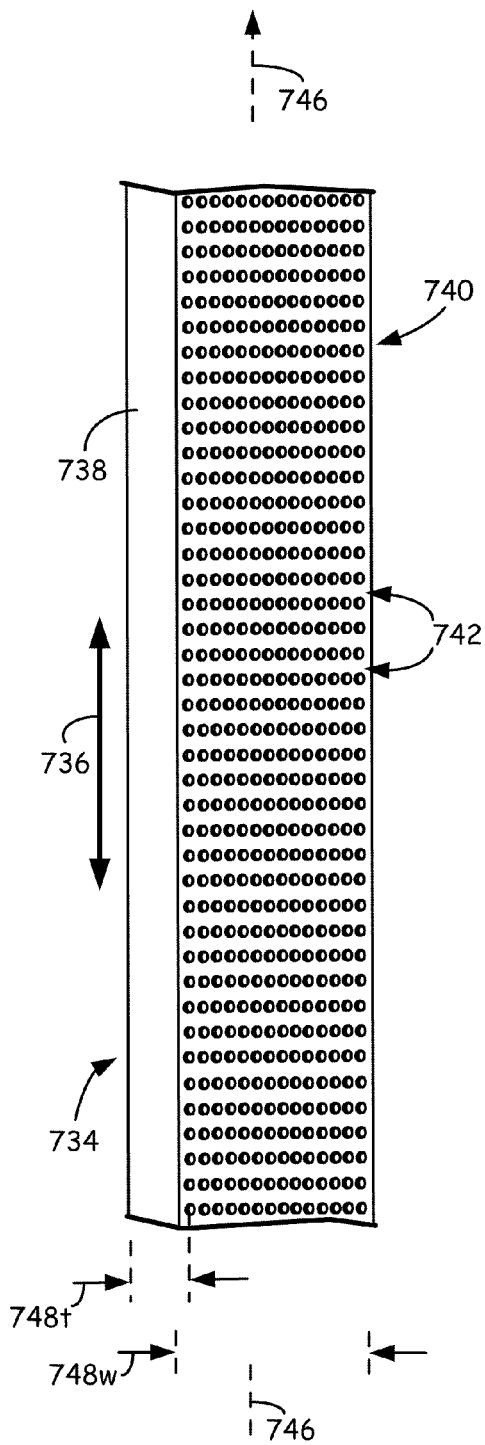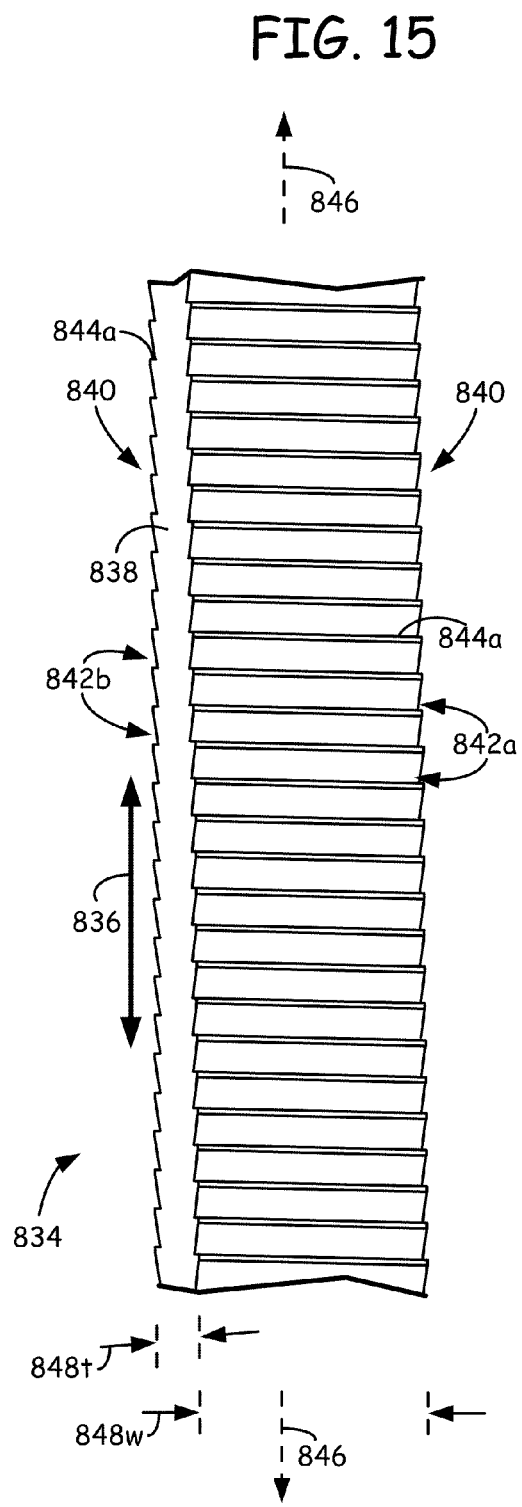

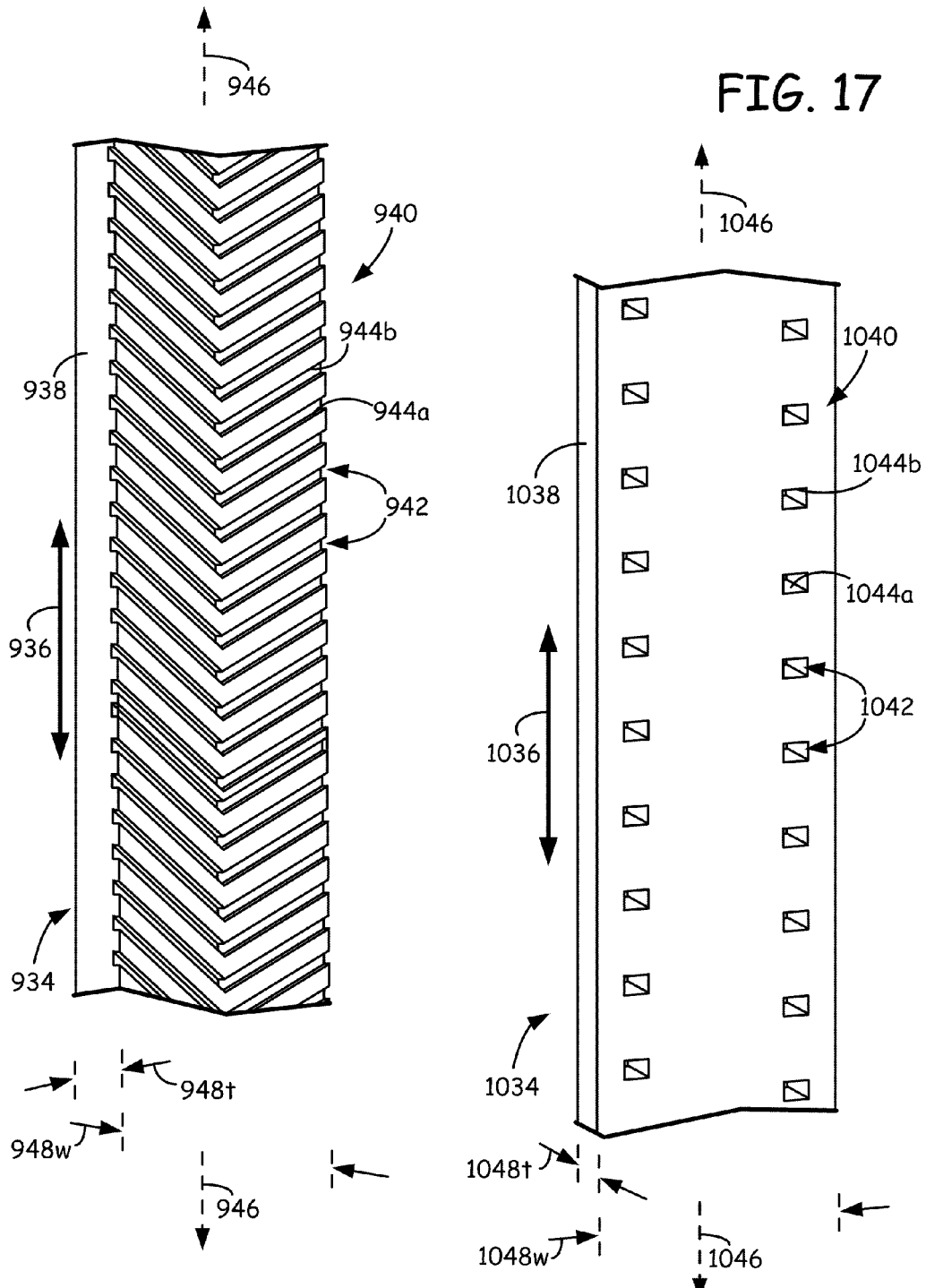

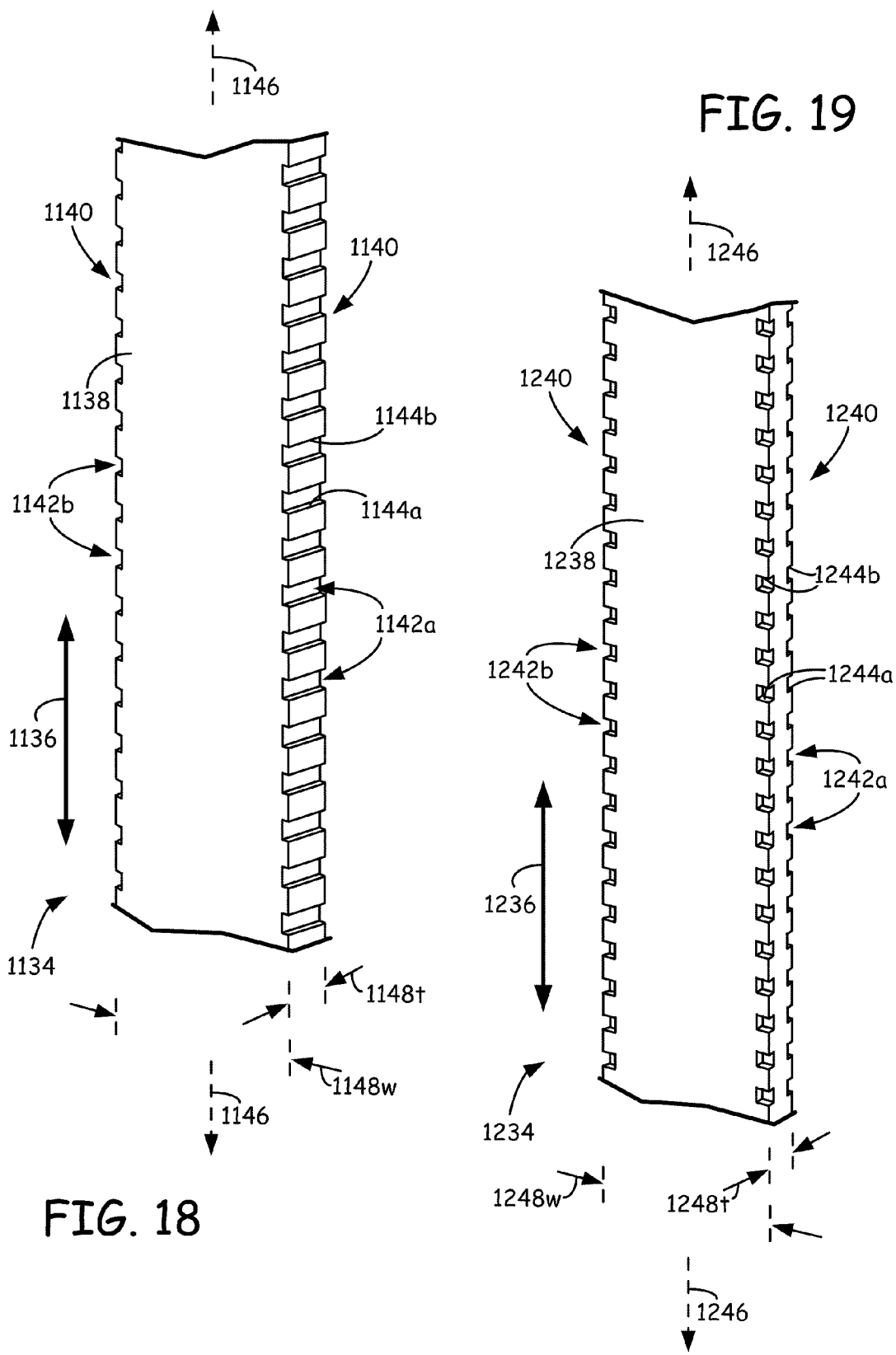

METHOD FOR BUILDING THREE-DIMENSIONAL MODELS IN EXTRUSION-BASED DIGITAL MANUFACTURING SYSTEMS USING TRACKED FILAMENTS

CROSS-REFERENCE TO RELATED APPLICATION(S)

This application claims priority to U.S. Provisional Patent Application No. 61/247,078, filed on Sep. 30, 2009, and entitled "Consumable Materials Having Topographical Surface Patterns For Use In Extrusion-Based Digital Manufacturing Systems".

Reference is hereby made to U.S. patent application Ser. No. 12/612,329, filed on Nov. 4, 2009, and entitled "Ribbon Liquefier For Use In Extrusion-Based Digital Manufacturing Systems", which claims priority to U.S. Provisional Patent Application No. 61/247,068, filed on Sep. 30, 2009.

Reference is also hereby made to U.S. patent application Ser. No. 12/612,333, filed on Nov. 4, 2009 and entitled "Non-Cylindrical Filament For Use In Extrusion-Based Digital Manufacturing Systems", which claims priority to U.S. Provisional Patent Application No. 61/247,067, filed on Sep. 30, 2009.

BACKGROUND

The present disclosure relates to direct digital manufacturing systems for building three-dimensional (3D) models. In particular, the present invention relates to consumable materials, such as modeling and support materials, for use in extrusion-based digital manufacturing systems.

An extrusion-based digital manufacturing system (e.g., fused deposition modeling systems developed by Stratasys, Inc., Eden Prairie, Minn.) is used to build a 3D model from a digital representation of the 3D model in a layer-by-layer manner by extruding a flowable consumable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

Movement of the extrusion head with respect to the substrate is performed under computer control, in accordance with build data that represents the 3D model. The build data is obtained by initially slicing the digital representation of the 3D model into multiple horizontally sliced layers. Then, for each sliced layer, the host computer generates a build path for depositing roads of modeling material to form the 3D model.

In fabricating 3D models by depositing layers of a modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Consumable support material is then deposited from a second nozzle pursuant to the generated geometry during the build process. The support material adheres to the modeling material during fabrication, and is removable from the completed 3D model when the build process is complete.

SUMMARY

An aspect of the present disclosure is directed to a consumable material for use in an extrusion-based digital manufacturing system. The consumable material includes a length and a surface pattern along at least a portion of the length that is configured to engage with a drive mechanism of the extrusion-based digital manufacturing system. The topographical surface pattern provides a fractal dimensionality for at least a portion of an exterior surface of the consumable material that is greater than two for a length scale between 0.01 millimeters and 1.0 millimeter.

Another aspect of the present disclosure is directed to a consumable material for use in an extrusion-based digital manufacturing system, where the consumable material includes a composition comprising at least one material having amorphous properties and a geometry. The geometry of the consumable material includes a length, an exterior surface extending along the length, and a plurality of tracks formed in the exterior surface along at least a portion of the length, wherein the plurality of tracks provide a fractal dimensionality for the exterior surface that is greater than two for a length scale between 0.01 millimeters and 1.0 millimeter.

Another aspect of the present disclosure is directed to a method for forming a consumable material for use in an extrusion-based digital manufacturing system. The method includes providing an extruded consumable material precursor comprising a length and an exterior surface extending along the length, where the extruded product is formed from an amorphous material. The method also includes forming a topographical surface pattern in the exterior surface along at least a portion of the length, where at least a portion of the topographical surface pattern is configured to engage with a drive mechanism of the extrusion-based digital manufacturing. The topographical surface pattern also provides a fractal dimensionality for the exterior surface that is greater than two for a length scale between 0.01 millimeters and 1.0 millimeter.

BRIEF DESCRIPTION OF THE DRAWINGS

FIG. 10 is a perspective view of a third alternative cylindrical filament having a topographical surface pattern that includes parabolic tracks.

FIG. 11 is a perspective view of a fourth alternative cylindrical filament having a topographical surface pattern that includes worm-type tracks.

FIG. 12 is a perspective view of a fifth alternative cylindrical filament having a topographical surface pattern that includes corrugated tracks.

FIG. 13 is a perspective view of a ribbon filament having a topographical surface pattern that includes rectangular tracks FIG. 14 is a perspective view of a first alternative ribbon filament having a topographical surface pattern that includes textured tracks.

FIG. 15 is a perspective view of a second alternative ribbon filament having a topographical surface pattern that includes impressed file-type tracks.

FIG. 16 is a perspective view of a third alternative ribbon filament having a topographical surface pattern that includes herringbone-type tracks.

FIG. 17 is a perspective view of a fourth alternative ribbon filament having a topographical surface pattern that includes sprocket tracks.

FIG. 18 is a perspective view of a fifth alternative ribbon filament having a topographical surface pattern that includes edge-facing rectangular tracks.

FIG. 19 is a perspective view of a sixth alternative ribbon filament having a topographical surface pattern that includes edge-facing sprocket tracks.

DETAILED DESCRIPTION

The present disclosure is directed to consumable materials, such as filaments of modeling materials and support materials, for use in extrusion-based digital manufacturing systems. The consumable materials have topographical surface patterns that allow filament drive mechanisms to engage and drive successive portions of the consumable materials into and/or through liquefiers. As discussed below, the consumable materials having topographical surface patterns are suitable for building 3D models and support structures with increased process reliability and part quality.

Figure 1:
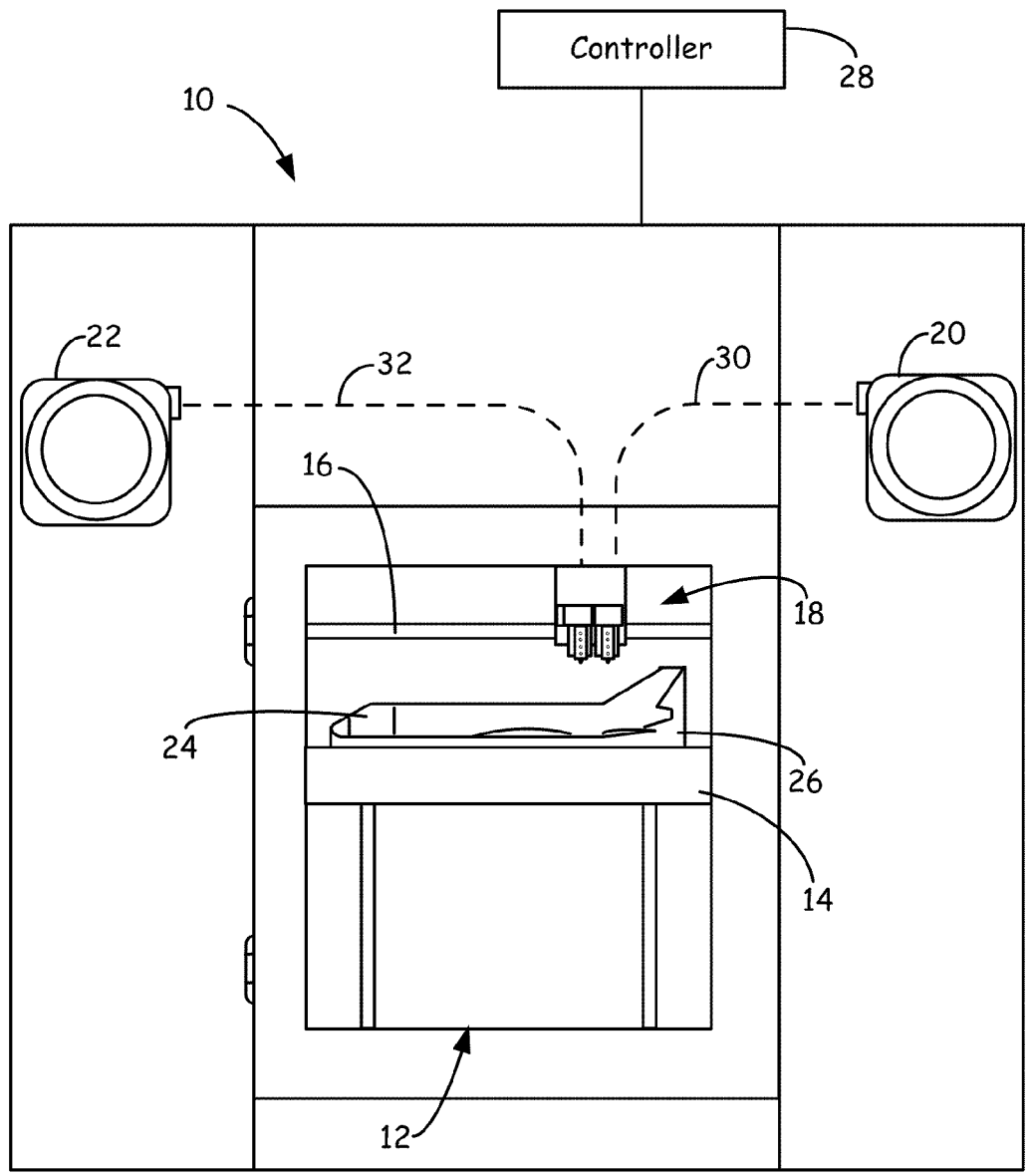
FIG. 1 is a front view of an extrusion-based digital manufacturing system for building 3D models and support structures from consumable materials having topographical surface patterns.

FIG. 1 is a front view of system 10, which is an extrusion-based digital manufacturing system that includes build chamber 12, platen 14, gantry 16, extrusion head 18, and supply sources 20 and 22. As discussed below, extrusion head 18 is configured to receive and melt successive portions of modeling material filaments and support material filaments (not shown in FIG. 1) during a build operation, where modeling material filaments and/or the support material filaments have topographical surface patterns. Suitable extrusion-based digital manufacturing systems for system 10 include fused deposition modeling systems developed by Stratasys, Inc., Eden Prairie, Minn.

Build chamber 12 is an enclosed environment that contains platen 14, gantry 16, and extrusion head 18 for building a 3D model (referred to as 3D model 24) and a corresponding support structure (referred to as support structure 26). Platen 14 is a platform on which 3D model 24 and support structure 26 are built, and moves along a vertical z-axis based on signals provided from a computer-operated controller (referred to as controller 28). Gantry 16 is a guide rail system configured to move extrusion head 18 in a horizontal x-y plane within build chamber 12 based on signals provided from controller 28. The horizontal x-y plane is a plane defined by an x-axis and a y-axis (not shown in FIG. 1), where the x-axis, the y-axis, and the z-axis are orthogonal to each other. In an alternative embodiment, platen 14 may be configured to move in the horizontal x-y plane within build chamber 12, and extrusion head 18 may be configured to move along the z-axis. Other similar arrangements may also be used such that one or both of platen 14 and extrusion head 18 are moveable relative to each other.

Extrusion head 18 is supported by gantry 16 for building 3D model 24 and support structure 26 on platen 14 in a layer-by-layer manner, based on signals provided from controller 28. Extrusion head 18 includes a pair of filament drive mechanisms and liquefiers (not shown in FIG. 1), where a first drive mechanism is configured to drive successive portions of a modeling material filament into a first liquefier for melting and extruding the modeling material. Similarly, a second drive mechanism is configured to drive successive portions of a support material filament into a second liquefier for melting and extruding the support material.

The modeling material filament may be provided to extrusion head 18 from supply source 20 through pathway 30. Similarly, the support material filament may be provided to extrusion head 18 from supply source 22 through pathway 32. System 10 may also include additional drive mechanisms (not shown) configured to assist in feeding the filaments from supply sources 20 and 22 to extrusion head 18. Supply sources 20 and 22 are sources (e.g., spooled containers) for the filaments, and are desirably retained at a remote location from build chamber 12. Suitable assemblies for supply sources 20 and 22 include those disclosed in Swanson et al., U.S. Pat. No. 6,923,634; Comb et al., U.S. Pat. No. 7,122,246; and Taatjes et al, U.S. Patent Application Publication Nos. 2010/0096489 and 2010/0096485.

During a build operation, gantry 16 moves extrusion head 18 around in the horizontal x-y plane within build chamber 12, and the filaments are fed to the filament drive mechanisms of extrusion head 18. As discussed below, the first drive mechanism desirably engages with the modeling material filament at its topographical surface pattern and applies an axial pressure to the modeling material filament, desirably without creating sliding friction between the modeling material filament and the first drive mechanism. The axial pressure drives successive portions of the modeling material filament into the first liquefier, which thermally melts the successive portions. The upstream, unmelted portions of the modeling material filament may function as a piston with a viscosity-pump action to extrude the molten modeling material out of the first liquefier to build 3D model 24.

Similarly, the second drive mechanism engages with the support material filament at its topographical surface pattern and applies axial pressure to the support material filament, also desirably without creating sliding friction between the support material filament and the second drive mechanism.

The axial pressure drives successive portions of the support material filament into the second liquefier, which thermally melts the successive portions. The upstream, unmelted portions of the support material filament may function as a piston with a viscosity-pump action to extrude the molten support material out of the first liquefier to build support structure 26.

The extruded modeling and support materials are deposited onto platen 14 to build 3D model 24 and support structure 26 using a layer-based additive technique. Support structure 26 is desirably deposited to provide vertical support along the z-axis for overhanging regions of the layers of 3D model 24. After the build operation is complete, the resulting 3D model 24/support structure 26 may be removed from build chamber 12, and support structure 26 may be removed from 3D model 24.

Figure 2:
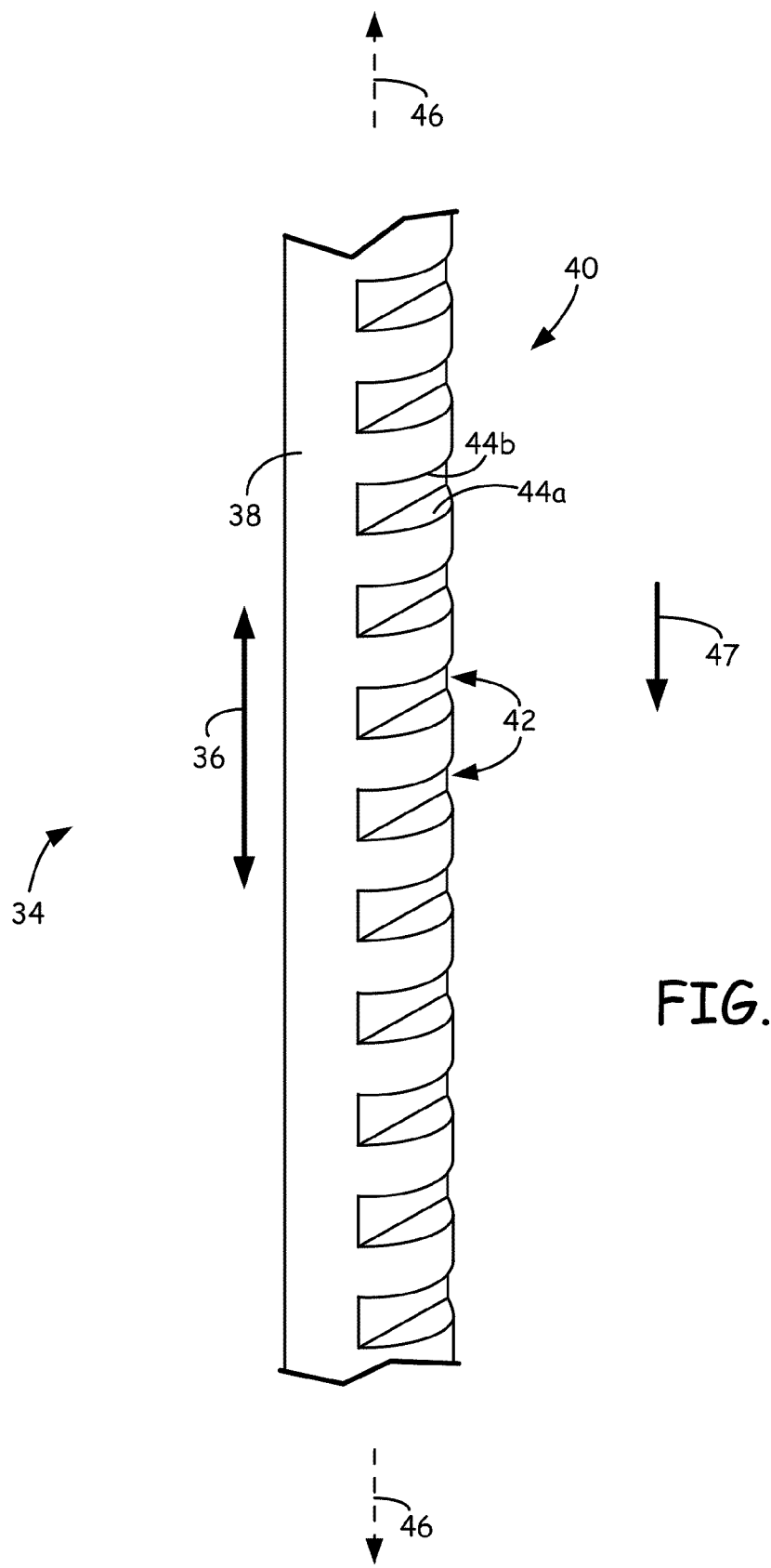
FIG. 2 is a perspective view of a portion of a cylindrical filament having a topographical surface pattern that includes rectangular tracks.
Figure 3:
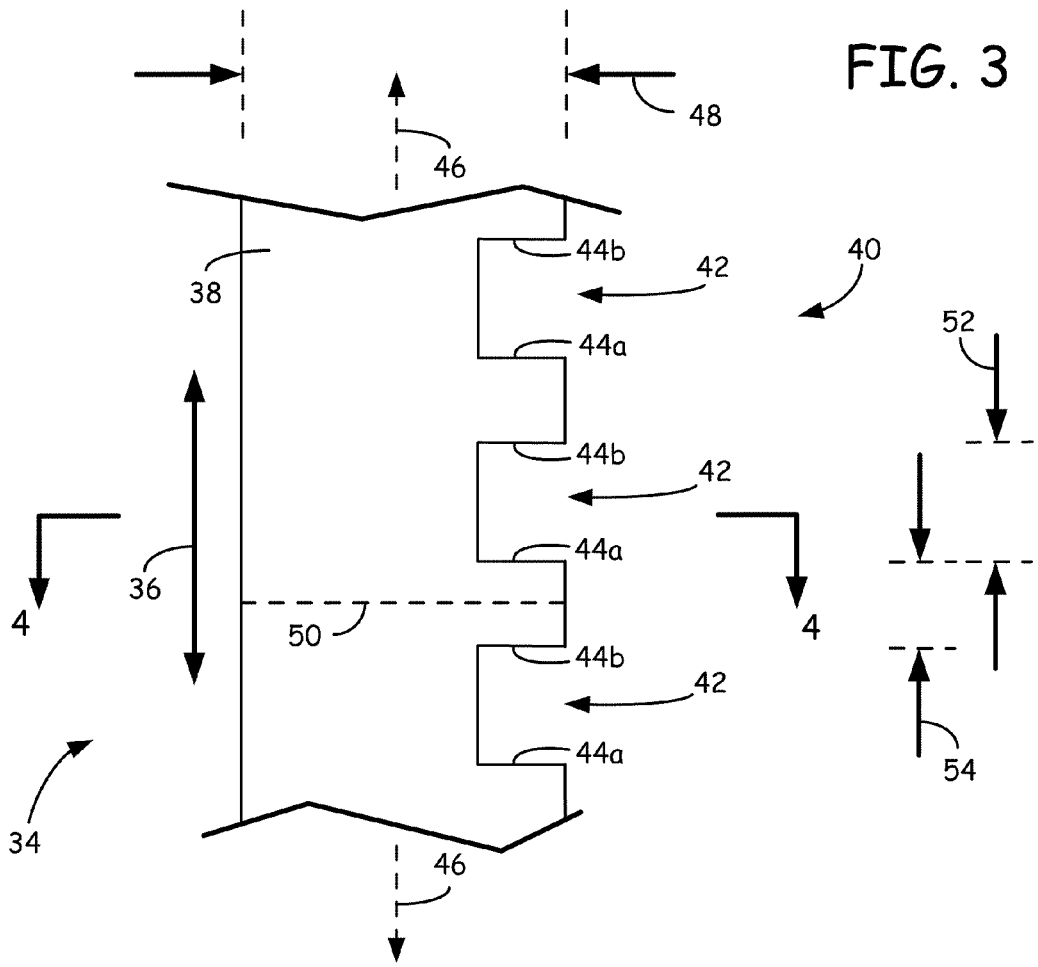
FIG. 3 is a side view of a portion of the cylindrical filament.

FIGS. 2 and 3 illustrate filament 34, which is an example of a suitable consumable material of the present disclosure for use as a modeling material filament and/or a support material filament with system 10. As shown in FIG. 2, filament 34 is a cylindrical filament having length 36. In alternative embodiments, as discussed below, the modeling material filament and/or the support material filament may be a non-cylindrical filament, which has a substantially non-circular cross-sectional profile (e.g., a ribbon filament having a rectangular cross-sectional profile).

Length 36 is a continuous length that may vary depending on the amount of filament 34 remaining in supply source 20 or 22 (shown in FIG. 1). Filament 34 is desirably flexible along length 36 to allow filament 34 to be retained in supply sources 20 and 22 (e.g., wound on spools) and to be fed through system 10 (e.g., through pathways 30 and 32) without plastically deforming or fracturing. For example, in one embodiment, filament 34 is desirably capable of withstanding elastic strains greater than t/r, where "t" is a cross-sectional thickness of filament 34 in the plane of curvature, and "r" is a bend radius (e.g., a bend radius in supply source 20 or 22 and/or a bend radius through pathway 30 or 32).

As further shown, filament 34 also includes exterior surface 38 extending along length 36, and surface pattern 40, which is a topographical surface pattern formed in exterior surface 38 along at least a portion of length 36. Surface pattern 40 desirably extends along the entire length 36, thereby allowing substantially the entire length 36 of filament 34 to be consumed in system 10. In the shown embodiment, surface pattern 40 includes tracks 42, which are substantially-rectangular indentations formed in exterior surface 38, and where each track 42 includes an upward-facing surface 44a and a downward-facing surface 44b. As discussed below, in alternative embodiments, surface pattern 40 may include a variety of different track designs for engaging with a filament drive mechanism of system 10 (e.g., as shown in FIGS. 8-19).

Tracks 42 are configured to engage with the first or second drive mechanism of extrusion head 18 (shown in FIG. 1), thereby allowing the given filament drive mechanism to generate downward axial pressures to axial surfaces 44a. An axial pressure applied to a filament (e.g. filament 34) refers to a pressure that is directed substantially along the longitudinal axis of the filament (referred to as axis 46). The axial pressures accordingly drive successive portions of filament 34 downward, as illustrated by arrow 47, without creating sliding friction between the filament drive mechanism and filament 34.

Filament 34 may be manufactured from a variety of extrudable modeling and support materials for respectively building 3D model 24 and support structure 26 (shown in FIG. 1). Suitable modeling materials for filament 34 include polymeric and metallic materials. In some embodiments, suitable modeling materials include materials having amorphous properties, such as thermoplastic materials, amorphous metallic materials, and combinations thereof. Examples of suitable thermoplastic materials for filament 34 include acrylonitrile-butadiene-styrene (ABS) copolymers, polycarbonates, polysulfones, polyethersulfones, polyphenylsulfones, polyetherimides, amorphous polyamides, modified variations thereof (e.g., ABS-M30 copolymers), polystyrene, and blends thereof. Examples of suitable amorphous metallic materials include those disclosed in U.S. Patent Application Publication No. 2009/0263582.

Suitable support materials for filament 34 include materials having amorphous properties (e.g., thermoplastic materials) and that are desirably removable from the corresponding modeling materials after 3D model 24 and support structure 26 are built. Examples of suitable support materials for filament 34 include water-soluble support materials commercially available under the trade designations "WATERWORKS" and "SOLUBLE SUPPORTS" from Stratasys, Inc., Eden Prairie, MN; break-away support materials commercially available under the trade designation "BASS" from Stratasys, Inc., Eden Prairie, MN, and those disclosed in Crump et al., U.S. Pat. No. 5,503,785; Lombardi et al., U.S. Pat. Nos. 6,070,107 and 6,228,923; Priedeman et al., U.S. Pat. No. 6,790,403; and Hopkins et al., U.S. Patent Application Pubilcation No. 2010/0096072.

The composition of filament 34 may also include additional additives, such as plasticizers, rheology modifiers, inert fillers, colorants, stabilizers, and combinations thereof. Examples of suitable additional plasticizers for use in the support material include dialkyl phthalates, cycloalkyl phthalates, benzyl and aryl phthalates, alkoxy phthalates, alkyl/aryl phosphates, polyglycol esters, adipate esters, citrate esters, esters of glycerin, and combinations thereof. Examples of suitable inert fillers include calcium carbonate, magnesium carbonate, glass spheres, graphite, carbon black, carbon fiber, glass fiber, talc, wollastonite, mica, alumina, silica, kaolin, silicon carbide, composite materials (e.g., spherical and filamentary composite materials), and combinations thereof. In embodiments in which the composition includes additional additives, examples of suitable combined concentrations of the additional additives in the composition range from about 1% by weight to about 10% by weight, with particularly suitable concentrations ranging from about 1% by weight to about 5% by weight, based on the entire weight of the composition.

Filament 34 also desirably exhibits physical properties that allow filament 34 to be used as a consumable material in system 10. In one embodiment, the composition of filament 34 is substantially homogenous along length 36. Additionally, the composition of filament 34 desirably exhibits a glass transition temperature that is suitable for use in build chamber 12. Examples of suitable glass transition temperatures at atmospheric pressure for the composition of filament 34 include temperatures of about 80° C. or greater. In some embodiments, suitable glass transition temperatures include about 100° C. or greater. In additional embodiments, suitable glass transition temperatures include about 120° C. or greater.

Filament 34 also desirably exhibits low compressibility such that its axial compression doesn't cause filament 34 to be seized within a liquefier. Examples of suitable Young's modulus values for the polymeric compositions of filament 34 include modulus values of about 0.2 gigapascals (GPa) (about 30,000 pounds-per-square inch (psi)) or greater, where the Young's modulus values are measured pursuant to ASTM D638-08. In some embodiments, suitable Young's modulus range from about 1.0 GPa (about 145,000 psi) to about 5.0

GPa (about 725,000 psi). In additional embodiments, suitable Young's modulus values range from about 1.5 GPa (about 200,000 psi) to about 3.0 GPa (about 440,000 psi).

Suitable topographical surface patterns for the consumable materials of the present disclosure (e.g., filament 34) have in common that the local surface normal is out of the plane normal to the longitudinal axis (e.g., axis 46) for at least a portion of the exterior surface of the filament (e.g., exterior surface 38). This allows an external filament drive mechanism to engage the exterior surface and generate an axial force using some compressive stress on the exterior surface. Without these topographical surface patterns, a filament drive mechanism is obliged to either impel the filament with only shear stress (such as with a rubber roller drive) or to generate such a pattern by plastic deformation of the filament (such as with a knurled filament drive).

A filament of a modeling or support material, in the absence of topographical surface patterning, is translationally symmetric. It is not necessarily axially symmetric (e.g., ribbon filament 636, shown in FIG. 13). However, the surface configuration of an unpatterned filament at some axial position is nearly identical to the surface configuration at an arbitrary separation distance down the length of the filament. Thus, the surface is approximately a two dimensional closed curve (e.g. a circle or a rectangle) extruded through a length. Accordingly, an unpatterned filament can be considered a two dimensional object since it has no features (other than eventually starting and stopping) along its length.

Fractal dimensionality, or fractals, is a suitable way to specify the geometric complexity of an object. Fractals are useful when the tortuousness of a line or surface varies with length scale. The classical example of a parameter with a fractal value is the length of the coastline of Scotland, where the length of the coastline increases as smaller and smaller undulations are considered. When viewed from a great height, the coastline appears somewhat as a circle, where its dimensionality is somewhat greater than one (i.e., a straight line). As the wetting of each grain of sand becomes a consideration, however, the coastline appears to fill the plane, and the fractal dimensionality of the coastline approaches two.

Accordingly, an unpatterned filament has a fractal dimensionality of two for length scales between 0.01 millimeters and 1.0 millimeter. In comparison, the exterior surface of a patterned filament so textured that it is a dense foam could almost fill three-space, and could have a fractal dimensionality of almost three for the same length scale. Thus, a suitable way to characterize a filament of the present disclosure having topographical surface pattern(s) is that the filament has a fractal dimensionality greater than two for a length scale between 0.01 millimeters and 1.0 millimeter.

As shown in FIG. 3, filament 34 has surface diameter 48, which is the non-track diameter of filament 34 (e.g., the diameter at line 50). Surface diameter 48 is desirably configured to allow filament 34 to mate with a liquefier of system 10 without undue friction. Examples of suitable average diameters for surface diameter 48 range from about 1.143 millimeters (about 0.045 inches) to about 2.54 millimeters (about 0.100 inches), with particularly suitable average diameters ranging from about 1.40 millimeters (about 0.055 inches) to about 2.16 millimeters (about 0.085 inches), and with even more particularly suitable average diameters ranging from about 1.65 millimeters (about 0.065 inches) to about 1.91 millimeters (about 0.075 inches).

As further shown in FIG. 3, each track 42 has a track height along axis 46 (referred to as track height 52), which is desirably configured to allow teeth of a filament drive mechanism to engage with the given track 42. In one embodiment, track heights 52 of the successive tracks 42 have substantially the same dimensions along axis 46. This provides a substantially repeating pattern of tracks 42 along length 36 of filament 34, which may be used with a filament drive mechanism having regularly-spaced teeth. In alternative embodiments, track heights 52 may vary in repeated patterns along axis 46, which may be suitable for use with filament drive mechanisms having irregularly-spaced teeth.

Additionally, the segments of filament 34 between adjacent tracks 42 along length 36 have heights (referred to as height 54) that are desirably thick enough to withstand the axial pressures applied by the filament drive mechanism without buckling, fracturing, or breaking. The numbers of tracks 42 along length 36 also desirably allow a filament drive mechanism to be continuously engaged with tracks 42. In other words, the filament drive mechanism desirably engages with a track 42 prior to or simultaneously with the disengagement of a previous track 42. This allows a substantially continuous application of axial pressures to surfaces 44a, which increases the drive control over filament 34.

Figure 4:
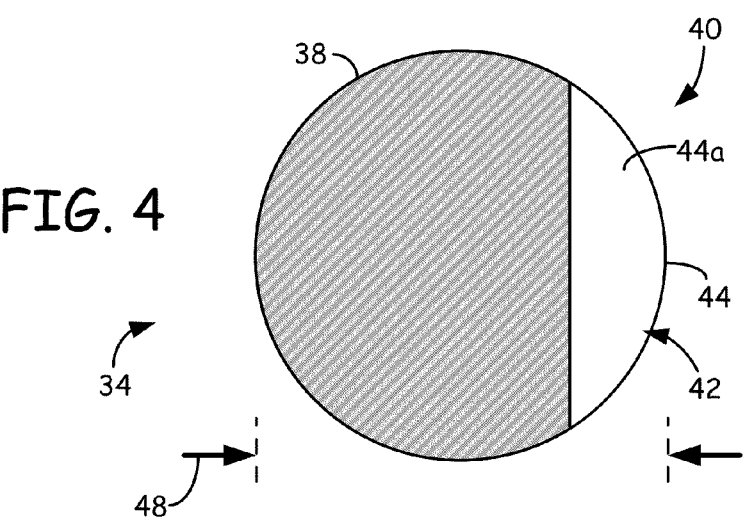
FIG. 4 is a sectional view of section 4-4 taken in FIG. 3.

FIG. 4 is an expanded sectional view of section 4-4 taken in FIG. 3, which illustrates the area of a track 42 relative to the non-track area of filament 34. The dimensions of track 42 desirably provide a balance between several competing factors. On one end, the dimensions are desirably high enough to provide a suitable contact surface area for a drive mechanism to apply axial pressure to surface 44a. Thus, tracks 42 are desirably deep enough from exterior surface 38 to provide suitable axial contact locations. On the other end, the dimensions are also desirably low enough to allow filament 34 to retain its structural integrity during use in system 10. As such, tracks 42 are also desirably shallow enough to prevent filament 34 from fracturing or breaking while being fed from supply sources 20 and/or 22 to extrusion head 18.

As discussed above, surface pattern 40 may include a variety of different track geometries for engaging with a filament drive mechanism of system 10 (e.g., as shown in FIGS. 8-17). Additionally, consumable materials of the present disclosure may have a variety of different geometries (e.g., cylindrical and non-cylindrical filaments). As a result, the depths of each track of surface pattern 40 (e.g., tracks 42) may vary depending on the geometries of the tracks and on the geometries of the consumable materials. A suitable technique for determining the dimensions of each track involves determining a ratio of the contact surface area of the track to the non-track area of the given consumable materials.

For example, suitable dimensions for each track 42 may determined as a ratio of the area of surface 44a relative to the non-track area of filament 34 (i.e., the area based on surface diameter 48). Examples of suitable areas for surface 44a include at least about 5% of the non-track area of filament 34, with particularly suitable areas ranging from about 5% to 30% of the non-track area, and with even more particularly suitable areas ranging from about 10% to 20% of the non-track area. This determination may also be applied to embodiments in which surface pattern 40 includes different track geometries and multiple tracks for a given cross-sectional profile.

Figure 5:
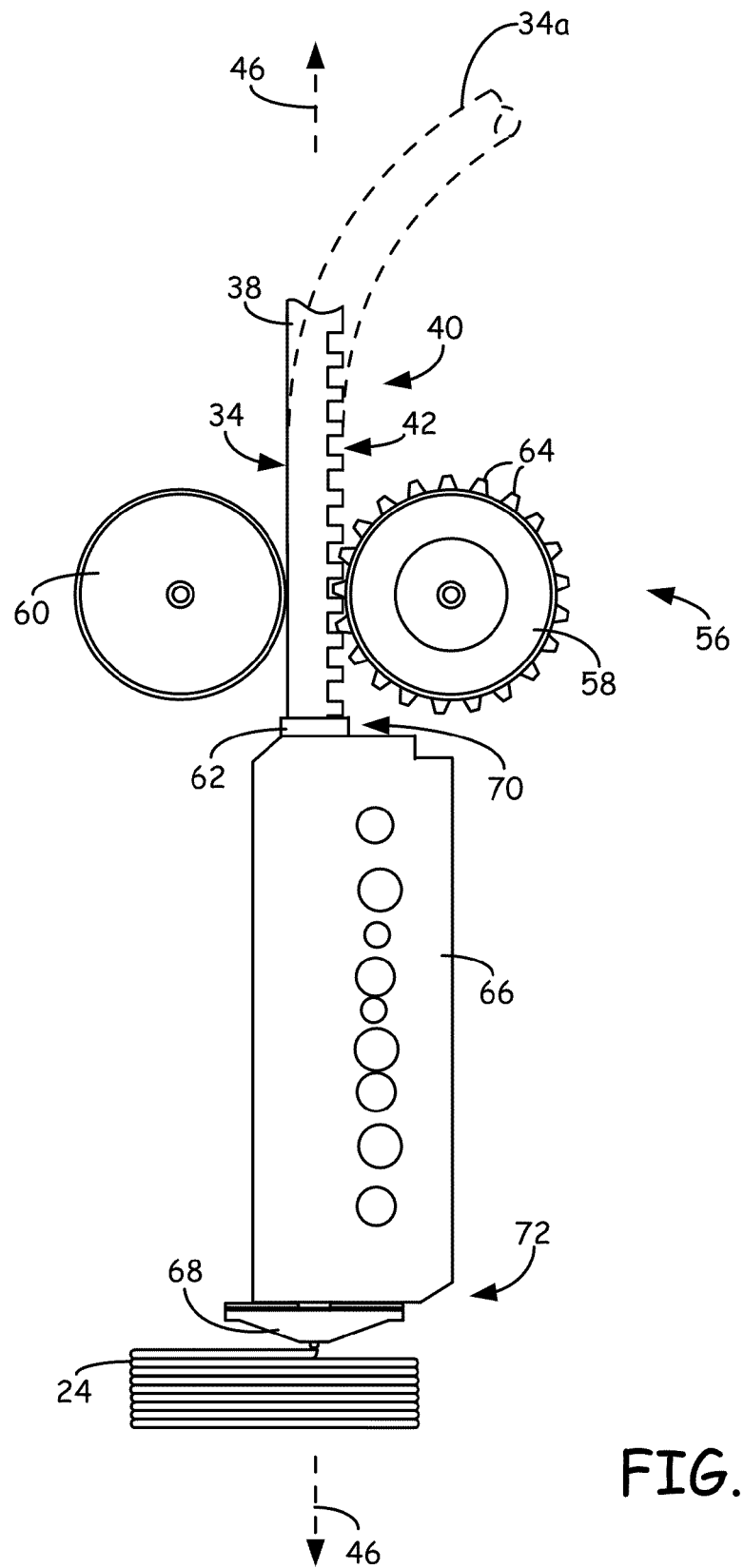
FIG. 5 is a schematic illustration of the cylindrical filament in used with an extrusion head subassembly that includes a filament drive mechanism having a drive wheel and an idler wheel.
Figure 6:
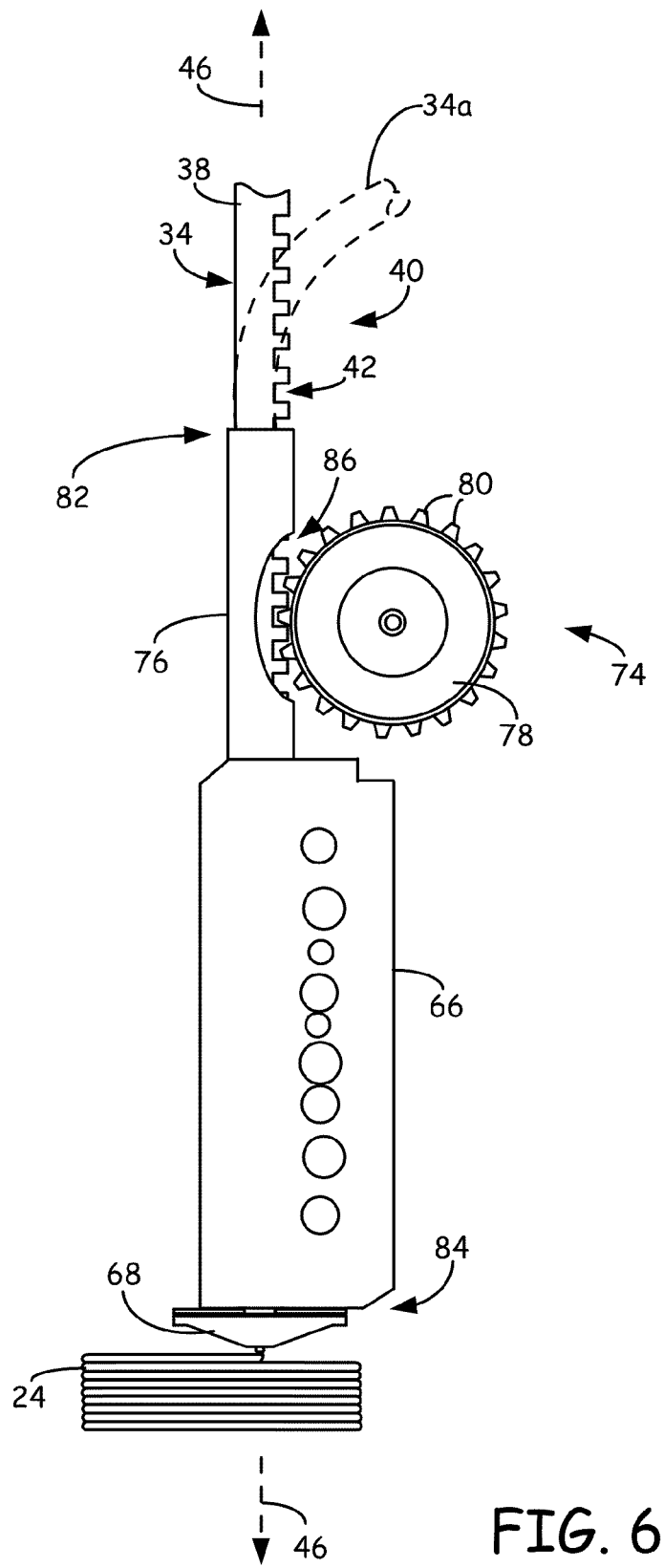
FIG. 6 is a schematic illustration of the cylindrical filament in used with a first alternative extrusion head subassembly that includes a ported liquefier and filament drive mechanism having a drive wheel.
Figure 7:
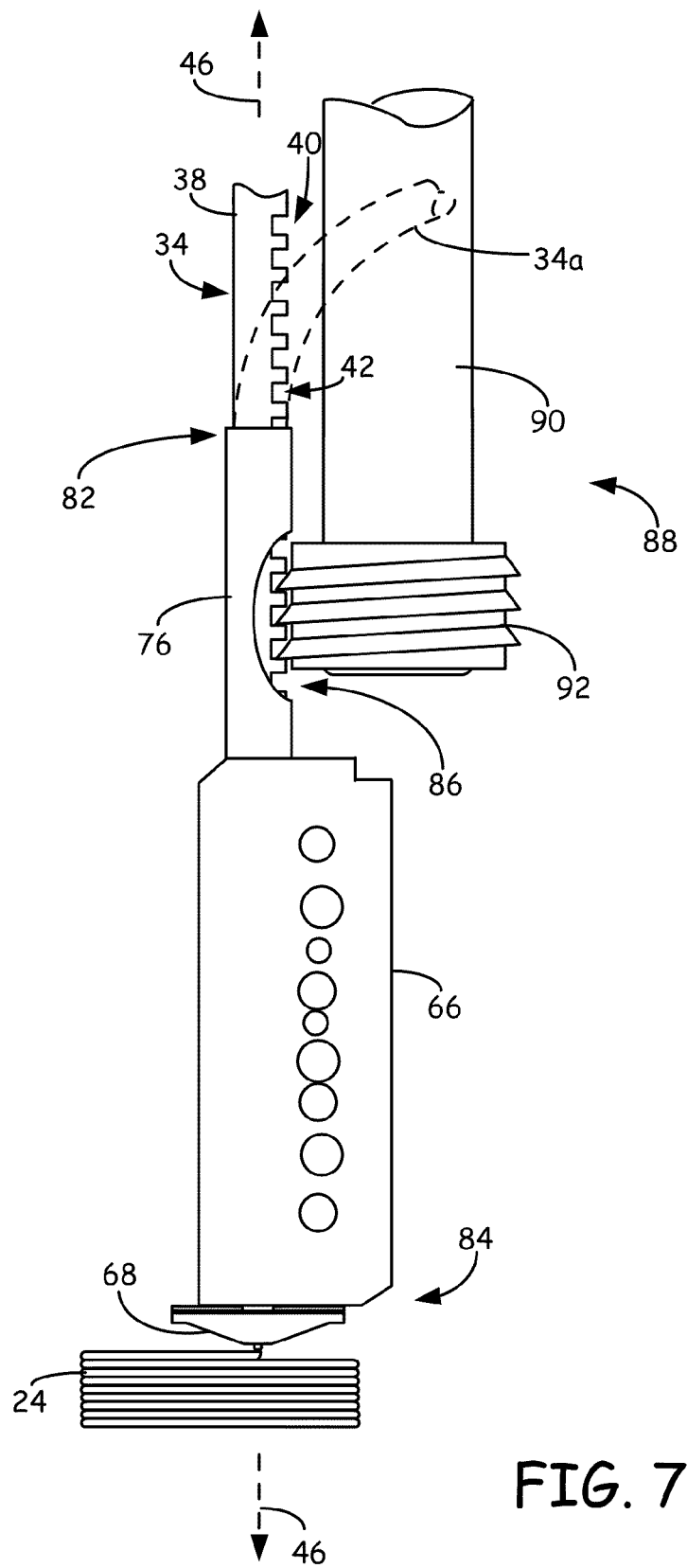
FIG. 7 is a schematic illustration of the cylindrical filament in used with a second alternative extrusion head subassembly that includes a ported liquefier and filament drive mechanism having a threaded rotatable shaft.

FIGS. 5-7 are schematic illustrations of filament 34 in use with alternative filament drive mechanisms of system 10 (shown in FIG. 1). As shown in FIG. 5, filament 34 is in use with drive mechanism 56, which is a filament drive mechanism that includes drive wheel 58 and idler wheel 60. Drive mechanism 56 is desirably in signal communication with controller 28, thereby allowing controller 28 (shown in FIG. 1) to direct the rates at which drive mechanism 56 feeds filament 34 to liquefier 62. Drive wheel 58 includes a plurality of teeth 64, which are configured to engage with tracks 42 of filament 34.

Teeth 64 desirably have dimensions that allow them to engage with tracks 42 without excessive friction. Examples of suitable teeth thicknesses range from about 50% of track height 52 to about 95% of track height 52, with particularly suitable thicknesses ranging from about 60% of track height 52 to about 85% of track height 52. In some embodiments, teeth 64 may be coated with one or more low-surface energy coating materials for reducing the risk of filament 34 sticking to teeth 64. Suitable coating materials include fluorinated polymers (e.g., polytetrafluoroethenes, fluorinated ethylene propylenes, and perfluoroalkoxy polymers), diamond-like carbon materials, and combinations thereof. Idler wheel 60 provides backing support to filament 34 while engaged with drive wheel 58.

FIG. 5 also illustrates liquefier 62, thermal block 66, and extrusion tip 66, which, along with drive mechanism 56, form a subassembly of extrusion head 18 (shown in FIG. 1). Liquefier 62 is a liquefier tube that includes top end 70 and bottom end 72, which are opposing ends of liquefier 62 along axis 46. As shown, liquefier 62 extends through thermal block 66 to receive thermal energy for melting the received portions of filament 34.

Thermal block 66 is a heat transfer component that extends around at least a portion of liquefier 62 and is configured to conduct heat to liquefier 62 and the received filament 34. Examples of suitable heat transfer components for thermal block 66 include those disclosed in Swanson et al., U.S. Pat. No. 6,004,124; Comb, U.S. Pat. No. 6,547,995; LaBossiere et al., U.S. Publication No. 2007/0228590; and Batchelder et al., U.S. Patent Application Publication No. 2009/0273122. In alternative embodiments, thermal block 66 may be replaced with a variety of different heat transfer components that generate and/or transfer heat to liquefier 62, thereby forming a thermal gradient within liquefier 62 along axis 46.

Extrusion tip 68 is a small-diameter tip that is located at a bottom end 72 of liquefier 62 and is configured to extrude the molten material of filament 34 with a desired road width. Examples of suitable inner tip diameters for extrusion tip 72 range from about 125 micrometers (about 0.005 inches) to about 510 micrometers (about 0.020 inches).

During a build operation in system 10 (shown in FIG. 1), filament 34 is engaged with teeth 64 of drive wheel 58 and loaded into liquefier 62 at top end 70. Controller 28 then directs drive mechanism 56 to drive successive portions of filament 34 into liquefier 62. The rotation of drive wheel 58 causes teeth 64 to apply axial pressures to successive surfaces 44a of filament 34. This drives filament 34 into liquefier 62, desirably without creating sliding friction between the filament 34 and the drive wheel 58.

As filament 34 passes through liquefier 62, the thermal gradient generated by thermal block 66 melts the material of filament 34 within liquefier 62. The upstream, unmelted portion of filament 34 being driven by drive mechanism 56 function as a piston with a viscosity pump acting on the molten material between the unmelted portion and the walls of liquefier 62, thereby extruding the molten material out of extrusion tip 68. The extruded material may then be deposited as roads to form 3D model 24 in a layer-by-layer manner.

As discussed above, the use of filament 34 with surface pattern 40 increases process reliability and part quality for building 3D model 24 with system 10. These features are attainable because tracks 42 allow drive mechanism 56 to drive filament 34 with a high-precision drive control. This correspondingly provides a tight control over the volumetric flow rate of the modeling material deposited from extrusion tip 68, which is desirable to build 3D model 24 with high-resolution features.

The high-precision drive control is attainable because the drive pressure applied to filament 34 is directed substantially along its longitudinal axis (i.e., axis 46). This is in comparison to filament drive mechanisms that frictionally engage conventional filaments. A frictional engagement typically applies a lateral pressure to the exterior surface of a filament and relies on the friction between the filament and a drive wheel to drive successive portions of the filament. However, unless the lateral pressures are sufficiently high, the filament may slip from the frictional grip of the filament drive mechanism, thereby creating frictional sliding which can reduce drive control.

Increasing the lateral pressure applied to the filament, however, may also reduce drive control. For example, an increased lateral pressure may cause a drive wheel to gouge the exterior surface of the filament (e.g., with notched drive wheels). This can result in a displacement of the modeling or support material of the filament, thereby potentially disrupting the predicted volume of material being driven to the liquefier for a given cross-sectional profile of the filament. Furthermore, for relatively-brittle materials, an increased lateral pressure can potentially fracture or break the filament at the engagement location. Such an event may result in delays in the build operation to re-feed the broken filament back into the liquefier.

Additionally, frictional engagements may be susceptible to back pressure variations in the liquefier. Variations in the thermal gradient of a liquefier may cause variations in the back pressure applied to the driven filament. In fact, for frictional engagements, back pressures within the liquefier may vary the amount of the filament that is being driven by ±5% for a particular drive torque. This may further result in lower part quality.

Surface pattern 40, however, reduces these potential issues by directing the drive pressure applied to filament 34 to a direction that is substantially along axis 46. The application of an axial pressure to filament 34 allows drive mechanism 56 to engage filament 34 without requiring a high lateral pressure and without the risk of filament slippage between filament 34 and drive wheel 58. As a result, the lateral pressure applied to filament 34 by drive mechanism 56 may be substantially less than is required for a frictional engagement design. This reduces the risk of fracturing or breaking filament 34 during use, thereby increasing the number of materials that may be used for modeling and support materials, such as relatively brittle materials.

Moreover, the engagement between teeth 64 of drive wheel 58 and tracks 42 of surface pattern 40 allows the drive rate of filament 34 to be accurately measured. For example, controller 28 (or any other suitable component of system 10) may monitor the torque applied to drive wheel 58. Since the drive pressure is applied to filament 34 in an axial direction, filament slippage is reduced or eliminated. As such, the torque required to rotate drive wheel 58 may be relied upon for accurately measuring the drive rate of filament 34.

As further shown in FIG. 5, in some embodiments, filament 34 may be fed to drive mechanism 56 with a curved orientation, as illustrated by filament 34a (shown with hidden lines). This is particularly suitable for embodiments in which surface pattern 40 only extends across a single lateral portion of exterior surface 38, as shown in FIG. 5. The curved orientation reduces the axial rotation of filament 34, which retains surface pattern 40 substantially aligned with drive wheel 64.

After a build operation is completed, any remaining quantity of filament 34 still residing in liquefier 62 may be removed by counter-rotating drive wheel 58. This causes teeth 64 to apply axial pressures to surfaces 44b of tracks 42, thereby driving filament 34 upward and out of liquefier 62. Thus, tracks 42 may be used for driving filament 34 into and through liquefier 62, and also for withdrawing filament 34 from liquefier 62 after a build operation is complete.

FIG. 6 illustrates filament 34 in use with drive mechanism 74 and ported liquefier 76, which are alternatives to drive mechanism 56 and liquefier 62 (shown in FIG. 5) and function in a similar manner. As shown in FIG. 6, drive mechanism 74 includes drive wheel 78, which includes a plurality of teeth 80, and functions in the same manner as drive wheel 58 (shown in FIG. 5). In comparison to liquefier 62, ported liquefier 76 includes top end 82, bottom end 84, and port 86 disposed between top end 82 and thermal block 66. In this embodiment, filament 34 may be retained within ported liquefier 76 prior to engagement with drive wheel 78 at port 86.

Ported liquefier 76 functions as a backing surface for the engagement between filament 34 and drive wheel 78, thereby precluding the need for an idler wheel corresponding to idler wheel 60 (shown in FIG. 5). Examples of suitable ported liquefier designs for ported liquefier 76 include those disclosed in Batchelder et al., U.S. Patent Application Publication Nos. 2009/0274540 and 2009/0273122.

During a build operation in system 10 (shown in FIG. 1), filament 34 is inserted into ported liquefier 76 at top end 82, and is engaged with teeth 80 of drive wheel 78 at port 86. Controller 28 (shown in FIG. 1) then directs drive mechanism 74 to drive successive portions of filament 34 through ported liquefier 76. The rotation of drive wheel 78 causes teeth 80 to apply axial pressures to successive surfaces 44a of filament 34, thereby driving filament 34 downward through ported liquefier 76, desirably without creating sliding friction between filament 34 and drive wheel 78. As filament 34 passes through ported liquefier 76, the thermal gradient generated by thermal block 66 melts the material of filament 34 within ported liquefier 76. The upstream, unmelted portion of filament 34 being driven by drive mechanism 74 function as a piston with a viscosity pump acting on the molten material between the unmelted portion and the walls of ported liquefier 76, thereby extruding the molten material out of extrusion tip 68. The extruded material may then be deposited as roads to form 3D model 24 in a layer-by-layer manner.

FIG. 7 illustrates filament 34 in use with ported liquefier 76 and drive mechanism 88, where drive mechanism 88 includes rotatable shaft 90 and threaded surface 92. Threaded surface 92 is an externally-threaded surface configured to engage with tracks 42 of filament 34. The rotation of rotatable shaft 90 allows threaded surface 92 to drive successive portions of filament 34 downward through ported liquefier 76 in a similar manner to that discussed above for drive mechanism 74 (shown in FIG. 6). Examples of suitable filament drive mechanisms for drive mechanism 88 (e.g., externally and internally-threaded mechanism) and suitable ported liquefier designs for ported liquefier 76 include those disclosed in Batchelder et al., U.S. patent application Ser. Nos. 12/150,667 and 12/150,669.

During a build operation in system 10 (shown in FIG. 1), filament 34 is inserted into ported liquefier 76 at top end 82, and is engaged with threaded surface 92 at port 86. Controller 28 (shown in FIG. 1) then directs drive mechanism 88 to drive successive portions of filament 34 downward through ported liquefier 76. The rotation of rotatable shaft 90 causes threaded surface 92 to apply axial pressures to successive surfaces 44a of filament 34, thereby driving filament 34 through ported liquefier 76. As filament 34 passes through ported liquefier 76, the thermal gradient generated by thermal block 66 melts the material of filament 34 within ported liquefier 76. The upstream, unmelted portion of filament 34 being driven by drive mechanism 88 function as a piston with a viscosity pump acting on the molten material between the unmelted portion and the walls of ported liquefier 76, thereby extruding the molten material out of extrusion tip 68. The extruded material may then be deposited as roads to form 3D model 24 in a layer-by-layer manner.

Figure 8:
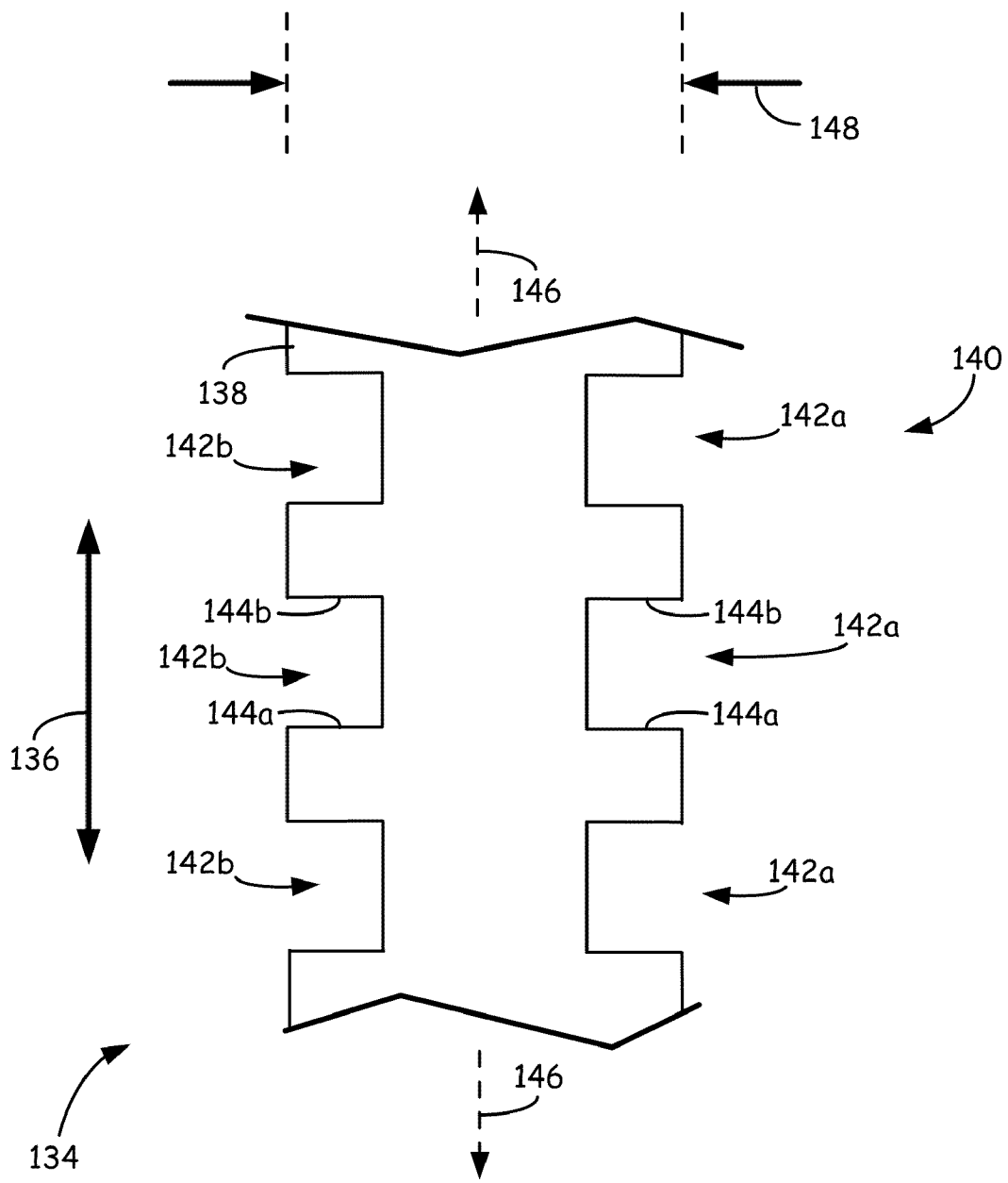
FIG. 8 is a side view of a portion of a first alternative cylindrical filament having a topographical surface pattern that includes two sets of rectangular tracks.
Figure 9:
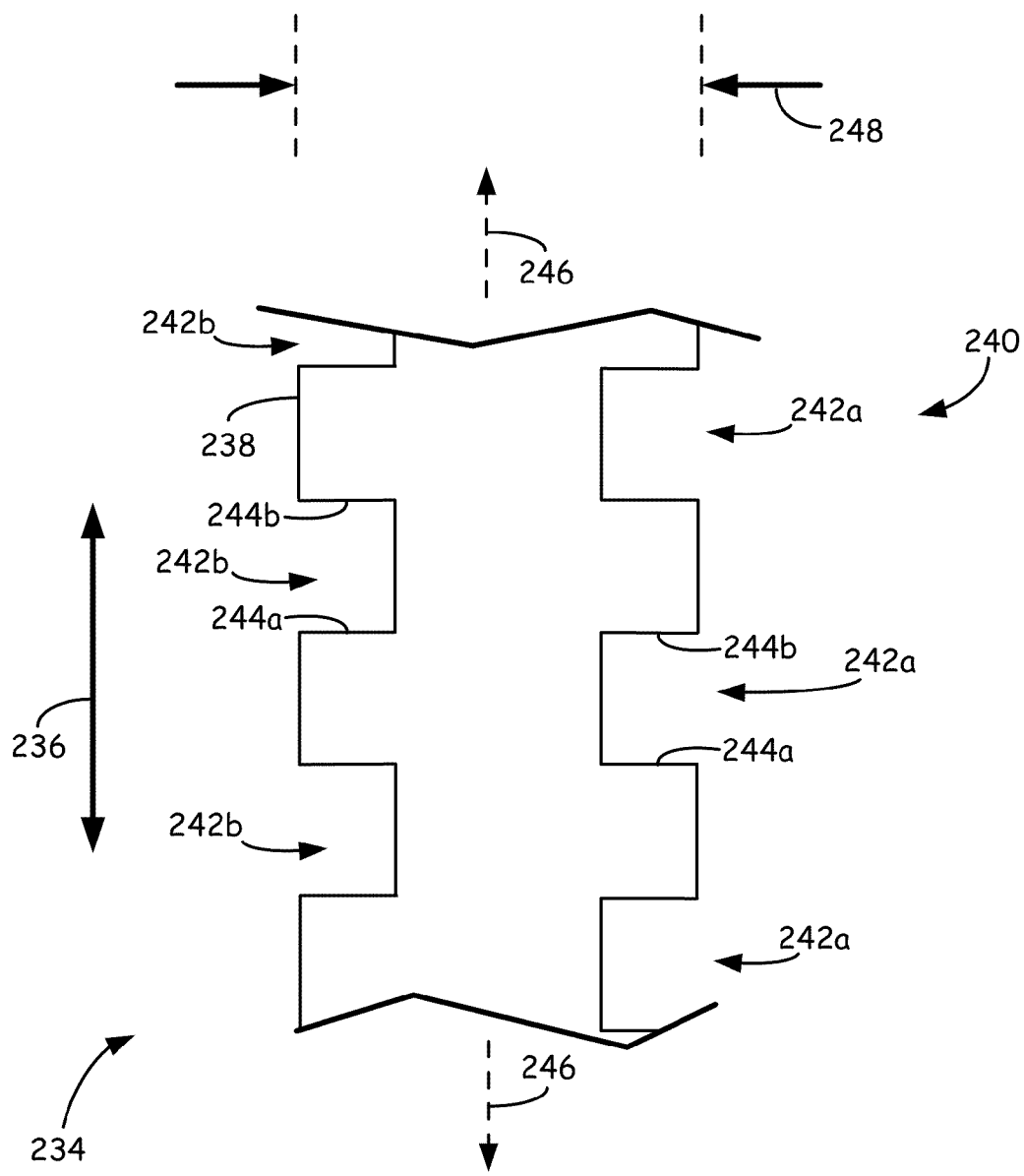
FIG. 9 is a side view of a portion of a second alternative cylindrical filament having a topographical surface pattern that includes two staggered sets of rectangular tracks.

FIGS. 8 and 9 respectively illustrate filaments 134 and 234, which are alternatives to filament 34 (shown in FIGS. 2-7), where the references labels are increased by 100 and 200, respectively. As shown in FIG. 8, surface pattern 140 of filament 134 includes tracks 142a and 142b, where tracks 142a correspond to tracks 42 of filament 34. Tracks 142b, however, are an additional set of tracks along at least a portion of length 136 that allow a second drive wheel (not shown) corresponding to drive wheels 58 and 78 to be used to engage and drive filament 134. Suitable dimensions and numbers of tracks for each of tracks 142a and 142b include those discussed above for tracks 142, thereby allowing a first drive wheel to continuously engage tracks 142a and a second drive wheel to continuously engage tracks 142b.

As shown in FIG. 9, surface pattern 240 of filament 234 includes tracks 242a and 242b, where tracks 242a correspond to tracks 42 of filament 34, but are separated farther apart along axis 46 compared to tracks 42. Tracks 242b are an additional set of tracks along at least a portion of length 236 that allow a second drive wheel (not shown) corresponding to drive wheels 58 and 78 to be used to engage and drive filament 234. In this embodiment, tracks 242a and 242b are staggered, which allows the continuous engagement between filament 234 and the filament drive mechanism to alternate between a first drive wheel and a second drive wheel. In other words, the first drive wheel desirably engages with a track 242a prior to or simultaneously with the disengagement the second drive wheel from a previous track 242b, and vice versa. This allows a substantially continuous application of axial pressures to surfaces 244a, which increases the drive control over filament 34.

FIGS. 10-12 are perspective views of filaments 334, 434, and 534, which are alternative cylindrical filaments to filament 34 (shown in FIGS. 2-7), and where the reference labels are increased by 300, 400, and 500, respectively. The opposing tracks of filament 134 (shown in FIG. 8) and the staggered opposing tracks of filament 234 (shown in FIG. 9) are also suitable alternative embodiments to filaments 334, 434, and 534.

As shown in FIG. 10, surface pattern 340 of filament 334 includes tracks 342, which are parabolic tracks having upward-facing surfaces 344a and downward-facing surfaces 344b. As discussed above, suitable dimensions for each track 342 may be determined as a ratio of the area of surface 344a relative to the non-track area of filament 334 (i.e., the area based on surface diameter 348). In comparison to the rectangular geometries of tracks 42, however, the parabolic geometries of tracks 342 cause surface 344a to merge into surface 344b at a midpoint within each track 342. As such, the area of each surface 344a may be determined as the area of the upward-facing surface of a track 342 up to a point along length 336 at which the surface is parallel to axis 346, which typically occurs at the midpoint between surfaces 344a and 344b.

As shown in FIG. 11, surface pattern 440 of filament 434 includes tracks 442, which are worm-type tracks having upward-facing surfaces 444a and downward-facing surfaces 444b. This embodiment is particularly suitable for use with screw-based filament drive mechanisms, such as drive mechanism 88 (shown in FIG. 7) and filament drive mechanisms as disclosed in Batchelder et al., U.S. Patent Application Publication Nos. 2009/0274540 and 2009/0273122 (e.g., helical drive mechanisms).

As shown in FIG. 12, surface pattern 540 of filament 534 includes tracks 542, which are corrugated tracks having upward-facing surfaces 544a and downward-facing surfaces 544b. This embodiment allows a filament drive mechanism to engage with tracks 542 at any lateral location of filament 532, thereby reducing the need to coaxially align surface pattern 540 and the filament drive mechanism.

The topographical surface patterns may be formed in the exterior surfaces of filaments 34, 134, 235, 334, 434, and 534 using a variety of techniques. In one embodiment, the topographical surface patterns may be formed by passing the given filament between a pair of rollers, where at least one of the rollers contains teeth configured to form the topographical surface patterns. For example, as filament 34 is drawn from an extruder to a desired diameter, surface pattern 40 may be formed in exterior surface 38 by feeding filament 34 through a pair of rollers, where one of the rollers has a teeth configured to form tracks 42 in exterior surface 38. In one embodiment, surface pattern 40 may be formed in exterior surface 34 prior to filament 34 fully solidifying. Alternatively, surface pattern 40 may be formed in exterior surface 34 after filament 34 is fully solidified. In either case, however, the topographical surface patterns are desirably formed in the exterior surfaces of the filaments prior to use in system 10 (e.g., prior to engagement with a filament drive mechanism).

FIGS. 13-19 are perspective views of ribbon filaments which are examples of suitable non-cylindrical filaments that may used with system 10 (shown in FIG. 1) as alternatives to filament 34 (shown in FIGS. 2-7), and where the reference labels are increased by 600-1200, respectively. The opposing tracks of filament 134 (shown in FIG. 8), the staggered opposing tracks of filament 234 (shown in FIG. 9), and the track geometries of filaments 334, 434, and 534 (shown in FIGS. 10-12) are also suitable alternative embodiments to the filaments disclosed in FIGS. 13-19.

Examples of suitable non-cylindrical filaments for the embodiments shown in FIGS. 13-19 include those disclosed in U.S. Provisional Patent Application No. 61/247,067; and U.S. Patent Application No. 12/612,333. Furthermore, examples of suitable liquefiers for use with the non-cylindrical filaments include those disclosed in U.S. Provisional Patent Application No. 61/247,068; and U.S. patent application Ser. No. 12/612,329.

As shown in FIG. 13, surface pattern 640 of ribbon filament 634 includes tracks 642, which are rectangular tracks having upward-facing surfaces 644a and downward-facing surfaces 644b. Suitable dimensions for each track 642 may be determined in the same manner as discussed above for filament 34. As such, the suitable dimensions may be determined as a ratio of the area of surface 644a relative to the non-track area of ribbon filament 634. The non-track area of ribbon filament 634 may be determined by the width and thickness of ribbon filament 634 at a non-track location along length 636 (referred to as width 648w and thickness 648t).

Examples of suitable dimensions for width 648w range from about 1.0 millimeter (about 0.04 inches) to about 10.2 millimeters (about 0.40 inches), with particularly suitable widths ranging from about 2.5 millimeters (about 0.10 inches) to about 7.6 millimeters (about 0.30 inches), and with even more particularly suitable widths ranging from about 3.0 millimeters (about 0.12 inches) to about 5.1 millimeters (about 0.20 inches).

Examples of suitable dimensions for thickness 348t range from about 0.08 millimeters (about 0.003 inches) to about 1.5 millimeters (about 0.06 inches), with particularly suitable thicknesses ranging from about 0.38 millimeters (about 0.015 inches) to about 1.3 millimeters (about 0.05 inches), and with even more particularly suitable thicknesses ranging from about 0.51 millimeters (about 0.02 inches) to about 1.0 millimeters (about 0.04 inches).

Examples of suitable aspect ratios of width 648w to thickness 348t include aspect ratios greater than about 2:1, with particularly suitable aspect ratios ranging from about 2.5:1 to about 20:1, and with even more particularly suitable aspect ratios ranging from about 3:1 to about 10:1.

As discussed in U.S. Provisional Patent Application No. 61/247,067; and U.S. patent application Ser. No. 12/612,333, the formation of topographical surface patterns (e.g., surface pattern 640) is particularly suitable when manufacturing ribbon filaments (e.g., ribbon filament 634) with a sheet extrusion process. In this embodiment, the topographical surface patterns may be formed in the major surfaces and/or edges of the extruded sheets prior to cutting the sheets into multiple ribbon filaments.

As shown in FIG. 14, surface pattern 740 of ribbon filament 734 includes tracks 742, where each track 742 is defined between a pair of rows of multiple outward-facing dimples. Suitable dimensions for each track 742 may be determined in the same manner as discussed above for filament 34. However, in this embodiment, the area of an upward-facing surface of each track 742 may be determined as the sum of the upward-facing surfaces of the outward-facing dimples in a given row. Moreover, the non-track area of ribbon filament 734 may be determined by the width and the thickness of ribbon filament 734 (referred to as width 748w and thickness 748t), where thickness 748t is measured at the outward-facing dimples, as shown in FIG. 14. Accordingly, during a build operation, a filament drive mechanism may apply axial pressures to the upward-facing surfaces of successive rows of the outward-facing dimples, thereby driving ribbon filament 734 downward.

As shown in FIG. 15, surface pattern 840 of ribbon filament 834 includes tracks 842a and 842b, each of which are impressed-file tracks having upward-facing surfaces 844a, and which are staggered along length 836. Suitable dimensions for each track 842 may also determined in the same manner as discussed above for filament 34. As such, the suitable dimensions may be determined as a ratio of the area of surface 844a relative to the non-track area of ribbon filament 834, where the non-track area of ribbon filament 834 may be determined by the width and the thickness of ribbon filament 834 (referred to as width 848w and thickness 848t).

Additionally, the staggered arrangement of surface pattern 840 allows the continuous engagement between ribbon filament 834 and the filament drive mechanism to alternate between a first drive wheel and a second drive wheel. In other words, the first drive wheel desirably engages with a track 842a prior to or simultaneously with the disengagement the second drive wheel from a previous track 842b, and vice versa. This allows a substantially continuous application of axial pressures to surfaces 844a, which increases the drive control over ribbon filament 834.

As shown in FIG. 16, surface pattern 940 of ribbon filament 934 includes tracks 942, which are herringbone-type tracks having upward-facing surfaces 944a and downward-facing surfaces 944b that extend in V-shaped patterns. This embodiment is suitable for use with a drive wheel having reciprocating V-shaped teeth (not shown). Suitable dimensions for each track 942 may also be determined in the same manner as discussed above for filament 34. In this embodiment, however, surfaces 944a extend along axis 946 as well as along the lateral axis of ribbon filament 934, such that a cross-sectional profile of ribbon filament 934 intersects multiple adjacent tracks 942. As such, the area of each surface 944a includes the entire V-shaped pattern. The non-track area of ribbon filament 934 is based on the width and thickness of ribbon filament 934 (referred to as width 1318w and thickness 948t), where thickness 948t is the thickness of ribbon filament at a non-track location along length 936.

As shown in FIG. 17, surface pattern 1040 of ribbon filament 1034 includes tracks 1042, which are sprocket tracks having upward-facing surfaces 1044a and downward-facing surfaces 1044b that extend through ribbon filament 1034 at staggered locations along length 1036. In this embodiment, suitable dimensions for each track 1042 may also be determined in the same manner as discussed above for filament 34. This embodiment is suitable for use with a drive wheel having alternating teeth, and allows either major surface of ribbon filament 1034 to face the drive wheel, which simplifies the engagement between the drive wheel and ribbon filament 1034.

As shown in FIG. 18, surface pattern 1140 of ribbon filament 1134 includes tracks 1142, which are edge-facing rectangular tracks having upward-facing surfaces 1144a and downward-facing surfaces 1144b. This embodiment is suitable for use with filament drive mechanisms configured to engage the edges of ribbon filament 1134, rather than the major surfaces of a ribbon filament, as shown above for ribbon filaments 634-1034 (shown in FIGS. 13-17). Suitable dimensions for each track 1142a and 1142b may also be determined in the same manner as discussed above for filament 34. Accordingly, during a build operation, a filament drive mechanism may apply axial pressures to surfaces 1144a at each edge of ribbon filament 1134, thereby driving ribbon filament 1134 downward.

As shown in FIG. 19, surface pattern 1240 of ribbon filament 1234 includes tracks 1242, which are edge-facing sprocket tracks having upward-facing surfaces 1244a and downward-facing surfaces 1244b. This embodiment is also suitable for use with filament drive mechanisms configured to engage the edges of ribbon filament 1234, rather than the major surfaces of a ribbon filament.

Suitable dimensions for each track 1242 may also be determined in the same manner as discussed above for filament 34. However, in this embodiment, the area of the upward-facing surfaces of each track 1242a and of each track 1242b may be determined as the sum of the pairs of surfaces 1244a at each edge of ribbon filament 1234. Thus, the area of a track 1242a may be determined as the sum of the pair of surfaces 1244a at an edge of ribbon filament 1234, and the area of a track 1242b may be determined as the sum of the pair of surfaces 1244a at the opposing edge of ribbon filament 1234. Accordingly, during a build operation, a filament drive mechanism may apply axial pressures to surfaces 1244a at each edge of ribbon filament 1234, thereby driving ribbon filament 1234 downward.

The topographical surface patterns may be formed in the exterior surfaces of ribbon filaments 634, 734, 834, 934, 1034, 1134, and 1234 using a variety of techniques. In one embodiment, the ribbon filaments may be formed with a sheet extrusion process as disclosed in U.S. Provisional Patent Application No. 61/247,067; and U.S. patent application Ser. No. 12/612,333. In this embodiment, the topographical surface patterns may be formed in the extruded sheets prior to being separated into multiple ribbon filaments.

Figure 20:
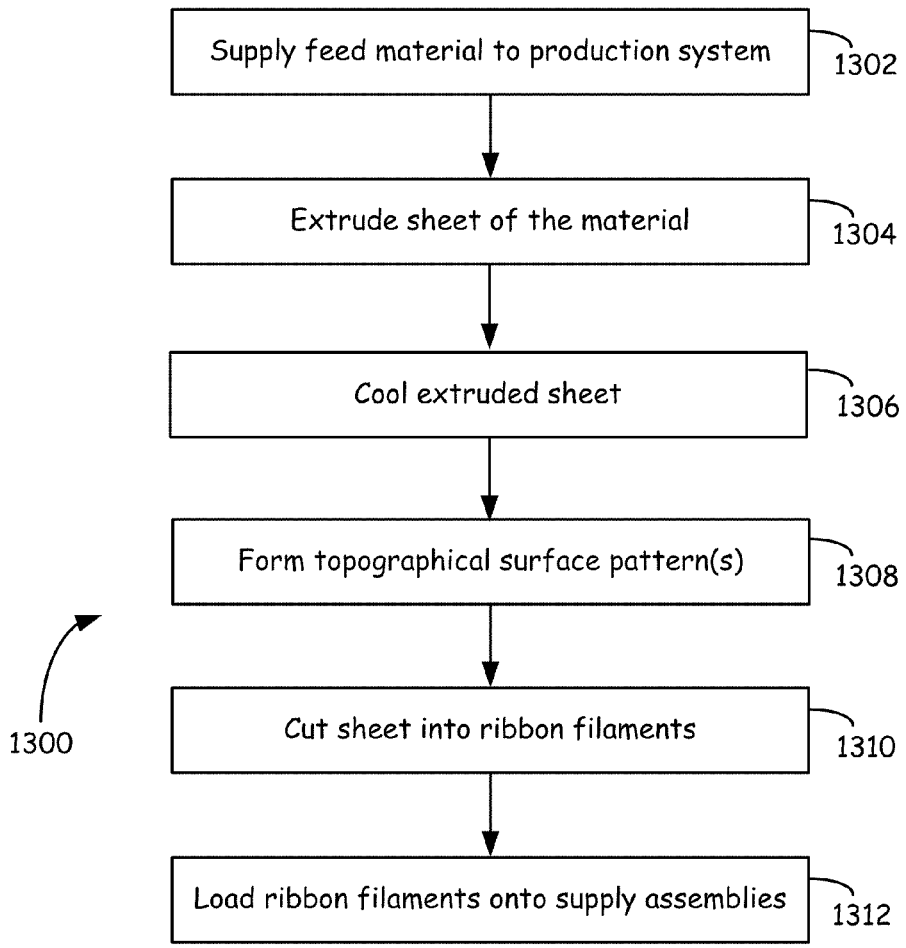
FIG. 20 is a flow diagram of a method of forming ribbon filaments having topographical surface patterns.

FIGS. 20-23 illustrate suitable embodiments for manufacturing non-cylindrical filaments, such as ribbon filament 634, 734, 834, 934, 1034, 1134, and 1234, prior to use in extrusion-based digital manufacturing systems (e.g., system 10, shown in FIG. 1). FIG. 20 is a flow diagram of method 1300, which is an example of a suitable method for manufacturing non-cylindrical filaments. As shown, method 1300 includes steps 1302-1312, and initially involves supplying a feed material to a sheet extrusion system (step 1302). The feed material may be supplied to the production system in a variety of different media, such as pellets, rods, powders, particulates, blocks, ingots, and the like. Suitable compositions for the feed materials include those discussed above for the modeling and support materials of filament 34 (shown in FIG. 2).

Upon being supplied to the sheet extrusion system, the feed material may be melted and extruded to produce an extruded sheet of the feed material (step 1304). As discussed below, the extruded sheet may subsequently be used and separated into a plurality of individual ribbon filaments, where the thickness of the extruded sheet in a solid state desirably matches the thickness of each of the ribbon filaments. After being extruded, the extruded sheet is desirably cooled to at least partially solidify the extruded sheet (step 1306), one or more topographical surface patterns may be formed in one or both major surfaces of the extruded sheet (step 1308). In an alternative embodiment, the topographical surface pattern(s) may be formed in the extruded sheet prior to, or simultaneously with, cooling the extruded sheet in step 1306.

At this point in the process, the sheet may be stored (e.g., wound up on a take-up spool) for subsequent separation or directly fed to a sheet cutter, such as in a continuous process. At the sheet cutter, the sheet may be cut longitudinally into the plurality of ribbon filaments, where the cross-sectional profile of at least one of the ribbon filaments is desirably configured to mate with a non-cylindrical liquefier, as discussed above (step 1310). More desirably, each of the ribbon filaments cut from the extruded sheet are configured to mate with a non-cylindrical liquefier. Furthermore, each ribbon filament desirably contains one or more topographical surfaces patterns based on the patterns formed in the extruded sheet.

After being cut, the ribbon filaments may then be loaded onto supply assemblies (step 1312). In one embodiment, the loading process for the plurality of ribbon filaments may be performed in a substantially parallel manner, where after being cut from the extruded sheet, the ribbon filaments are fed onto multiple take-up spools in a substantially continuous manner. The supply assemblies may then be used in one or more extrusion-based digital manufacturing systems (e.g., system 10) for building 3D models and support structures.

Figure 21:
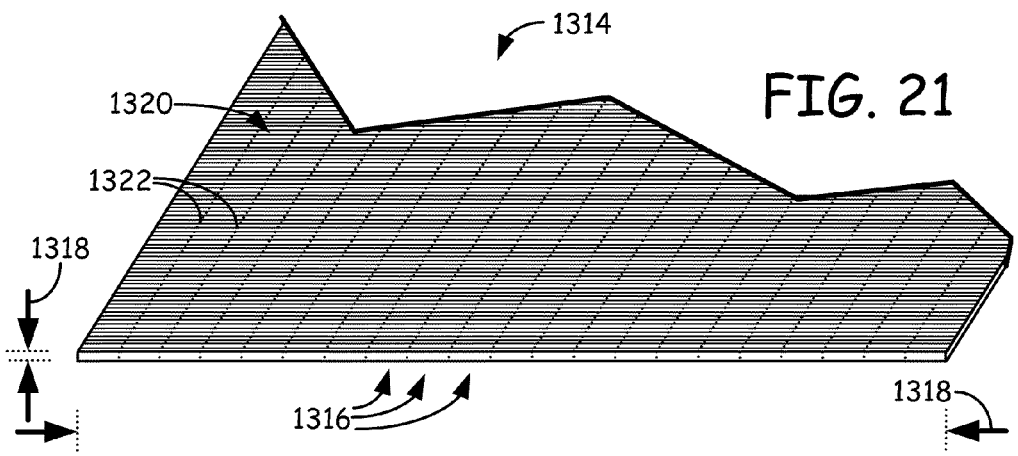
FIG. 21 is a perspective view of an extruded sheet used to form ribbon filaments having topographical surface patterns.

FIG. 21 is a perspective view of sheet 1314, which is an example of an extruded sheet that may be produced pursuant to steps 1302, 1304, 1306, and 1308 of method 1300 (shown in FIG. 20). As shown in FIG. 21, sheet 1314 may be cut into a plurality of ribbon filaments 1316, where each ribbon filament 1316 may correspond to one or more of ribbon filaments 634, 734, 834, 934, 1034, 1134, and 1234. The number of ribbon filaments 1316 that may be produced from a single sheet 1314 may vary depending on the width of sheet 1314 (referred to as sheet width 1318). Examples of suitable numbers of ribbon filaments 1316 that may be extruded from a single sheet 1314 range from about five to about one hundred, with particularly suitable numbers ranging from about ten to about fifty.

Sheet width 1318 of sheet 1314 desirably minimizes the amount of wasted material. As such, cut ribbon filaments 1316 desirably extend across the entire sheet width 1318. In alternative embodiments, however, one or more portions along the sheet width 1318 of sheet 1314 may be discarded or recycled. For example, the lateral edge portions of the width of sheet 1314 may be discarded or recycled, as desired. Examples of suitable dimensions for sheet width 1318 range from about 0.3 meters (about 1.0 foot) to about 1.2 meters (about 4.0 feet) with particularly suitable widths ranging from about 0.46 meters (about 1.5 feet) to about 0.91 meters (about 3.0 feet).

Additionally, sheet 1314, in a solidified state, desirably has a sheet thickness (referred to as sheet thickness 1320) that is substantially the same as the desired thicknesses of non-track thicknesses of the ribbon filaments (e.g., thickness 648$t$ of ribbon filament 634, shown in FIG. 13). Examples of suitable dimensions for sheet thickness 1320 range from about 0.08 millimeters (about 0.003 inches) to about 1.5 millimeters (about 0.06 inches), with particularly suitable thicknesses ranging from about 0.38 millimeters (about 0.015 inches) to about 1.3 millimeters (about 0.05 inches), and with even more particularly suitable thicknesses ranging from about 0.51 millimeters (about 0.02 inches) to about 1.0 millimeters (about 0.04 inches).

After being extruded and/or at least partially solidified, one or more topographical surfaces patterns may be formed in sheet 1314. This is illustrated in FIG. 21 with surface pattern 1322 having a plurality of tracks extending along parallel to width 1318. Sheet 1314 may then be cut into ribbon filaments 1316, pursuant to step 1310 of method 1300. This is illustrated in FIG. 8 with a cut line 1322 located between each ribbon filament 1316. After being cut from extrusion sheet 1314, each ribbon filament 1316 may then be loaded onto a supply assembly (e.g., a spool), pursuant to step 1312 of method 1300. This process allows multiple ribbon filaments 1316 to be fabricated from a single extruded sheet 1314 without requiring additional resizing steps to attain the desired thicknesses for ribbon filaments 1316. This correspondingly allows high production rates to be achieved.

Figure 22:
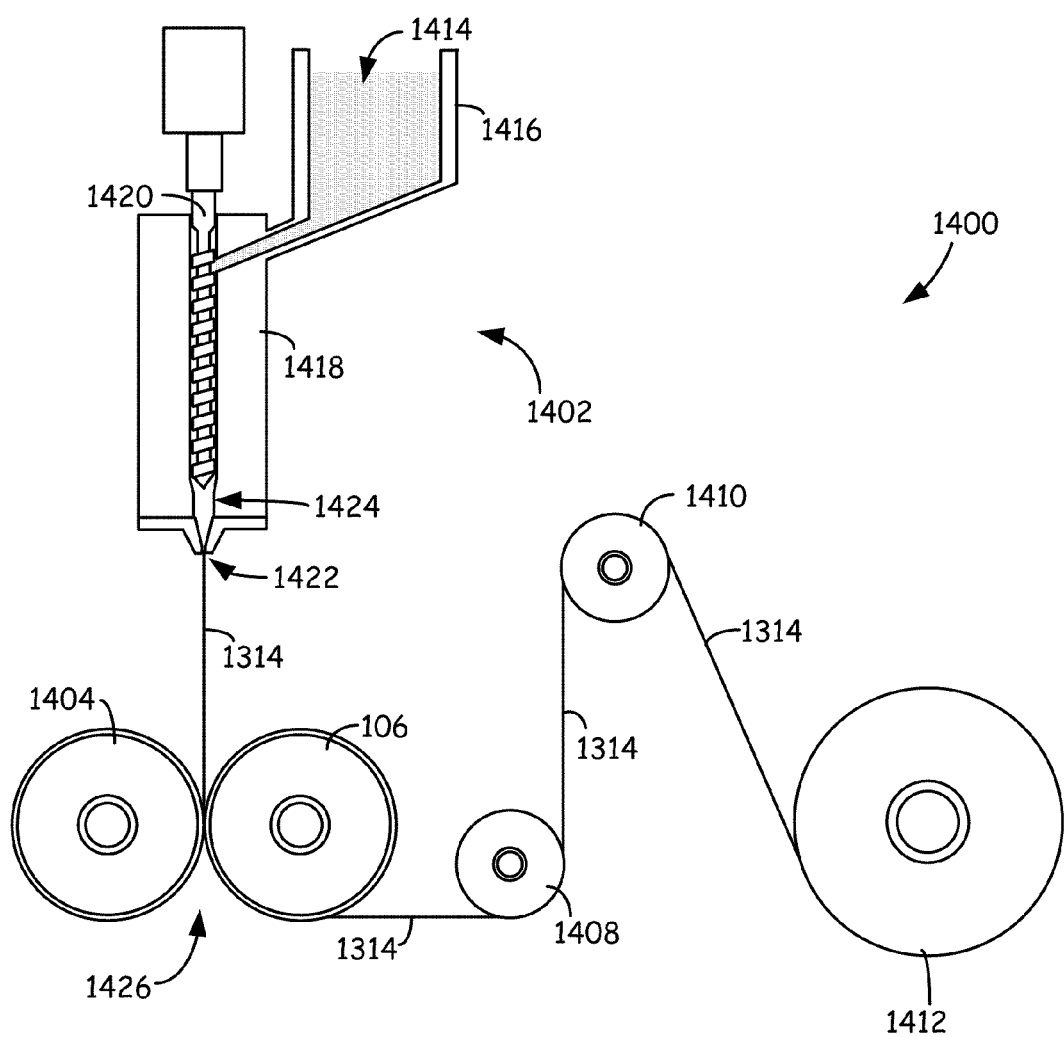
FIG. 22 is a schematic illustration of a sheet extrusion system for forming an extruded sheet having topographical surface patterns.

FIG. 22 is a schematic illustration of sheet extrusion system 1400, which is an example of a suitable system for producing extruded sheets (e.g., sheet 1314, shown in FIG. 21) pursuant to method 1300 (shown in FIG. 20). As shown, system 1400 includes extrusion assembly 1402, imprinter drum 1404, cooling drum 1406, pulleys 1408 and 1410, and take-up spool 1412. Extrusion assembly 1402 is configured to receive and extrude a feed material of the desired modeling and/or support material (shown as media 1414), to produce sheet 1314. Extrusion assembly 1402 includes hopper 1416, thermal sleeve 1418, drive screw 1420 and extrusion outlet 1422. While show in a vertical orientation, extrusion assembly 1402 (and system 1400) may alternatively be positioned in different orientations (e.g., a horizontal orientation). During operation, drive screw 1420 feeds successive portions of media 1414 from hopper 1416 to an extrusion shaft defined by thermal sleeve 1418 (referred to as extrusion shaft 1424). Thermal sleeve 1418 transfers thermal energy to media 1414 as media 1414 is fed into extrusion shaft 1422, thereby melting and extruding media 1414 out of extrusion outlet 1422 to produce sheet 1314.

In some embodiments, the extruded sheet may also be laminated with additional sheets of different materials to form a multi-layer sheet. Examples of suitable multi-layer sheets and multi-layer ribbon filaments formed from such sheets include those disclosed in U.S. Provisional Patent Application No. 61/247,067; and U.S. patent application Ser. No. 12/612,333.

Sheet 1314 may then engage drums 1404 and 1406 to define the thickness of sheet 1314 (i.e., sheet thickness 1320) and to form surface pattern 1320. Imprinter drum 1404 is a first cylindrical drum having a textured surface configured to form the tracks of surface pattern 1320 into sheet 1314 as sheet 1314 engages with imprinter drum 1404. Cooling drum 1406 is a second cylindrical drum that is desirably maintained at reduced temperatures to cool sheet 1314 as sheet 1314 engages with drums 1404 and 1406 at nip 1426. The reduced temperatures for cooling drum 1406 may vary depending on factors such as the line speed of sheet 1314, the composition and dimensions of sheet 1314, and the like. Examples of suitable temperatures for cooling drum 1406 range from about 40° C. to about 60° C. This allows sheet 1314 to at least partially solidify to a solid state while maintaining sheet thickness 1320 after passing through nip 126. In an alternative embodiment, imprinter drum 1404 may also function as a second cooling drum in the same manner as cooling drum 1406. Furthermore, in an additional alternative embodiment, cooling drum 1406 may function as a second imprinter drum to imprint a topographical surface pattern in the opposing major surface of sheet 1314.

Imprinter drum 1404 is desirably offset from cooling drum 106 at nip 126 at a distance that sets sheet thickness 1320 for sheet 1314. As a result, the thicknesses of successive portions of sheet 1314 may match the desired thickness of each ribbon filament 1316 that will be cut from sheet 1314. This allows each ribbon filament 1316 to subsequently mate with a corresponding non-cylindrical liquefier to attain reduced response times, as discussed above. In one embodiment, system 1400 may also include a sensor assembly (not shown) configured to detect and measure the sheet thickness of sheet 1314 in real time, and to adjust one or more processing parameters to achieve the desired sheet thickness (e.g., adjusting line speeds, nip dimensions, and the like).

In an additional embodiment, system 1400 may include one or more coating units (not shown) to apply a coating on one or both major surfaces of sheet 1314. For example, system 1400 may include a corona discharge unit (not shown) configured to deposit thin coatings of a material on either or both major surfaces of sheet 1314. This allows a variety of coating materials to be deposited on sheet 1314, such as low-surface energy materials. Low-surface energy materials may be beneficial for reducing frictional resistance as ribbon filaments 1316 are driven into non-cylindrical liquefiers of extrusion-based digital manufacturing systems (e.g., system 10).

Sheet 1314 may then wind around pulleys 1408 and 1410, and be wound up on take-up spool 1412, where one or more of drums 1404 and 1406, pulleys 1408 and 1410, and take-up spool 1412 may be motor drive to apply a suitable line speed for forming sheet 1314. Examples of suitable line speeds for forming sheet 1314 range from about 1 meter/minute to about 20 meters/minute, with particularly suitable line speeds ranging from about 5 meters/minute to about 15 meters/minute. In alternative embodiments, additional numbers of pulleys may be used to direct sheet 1314 to take-up spool 1412. After a suitable length of sheet 1314 is wound up on take-up spool 1412, sheet 1314 may be separated and take-up spool 1412 may be stored or set up for subsequent processing to cut sheet 1314 into separate ribbon filaments 1316, as discussed below. In an alternative embodiment, sheet 1314 may be fed directly to a cutting unit to cut sheet 1314 into separate ribbon filaments 1316. In this embodiment, take-up spool 1412 may be omitted and sheet 1314 may be cut into ribbon filaments 1316 in a continuous process with the extrusion and forming of successive portions of sheet 1314.

Figure 23:
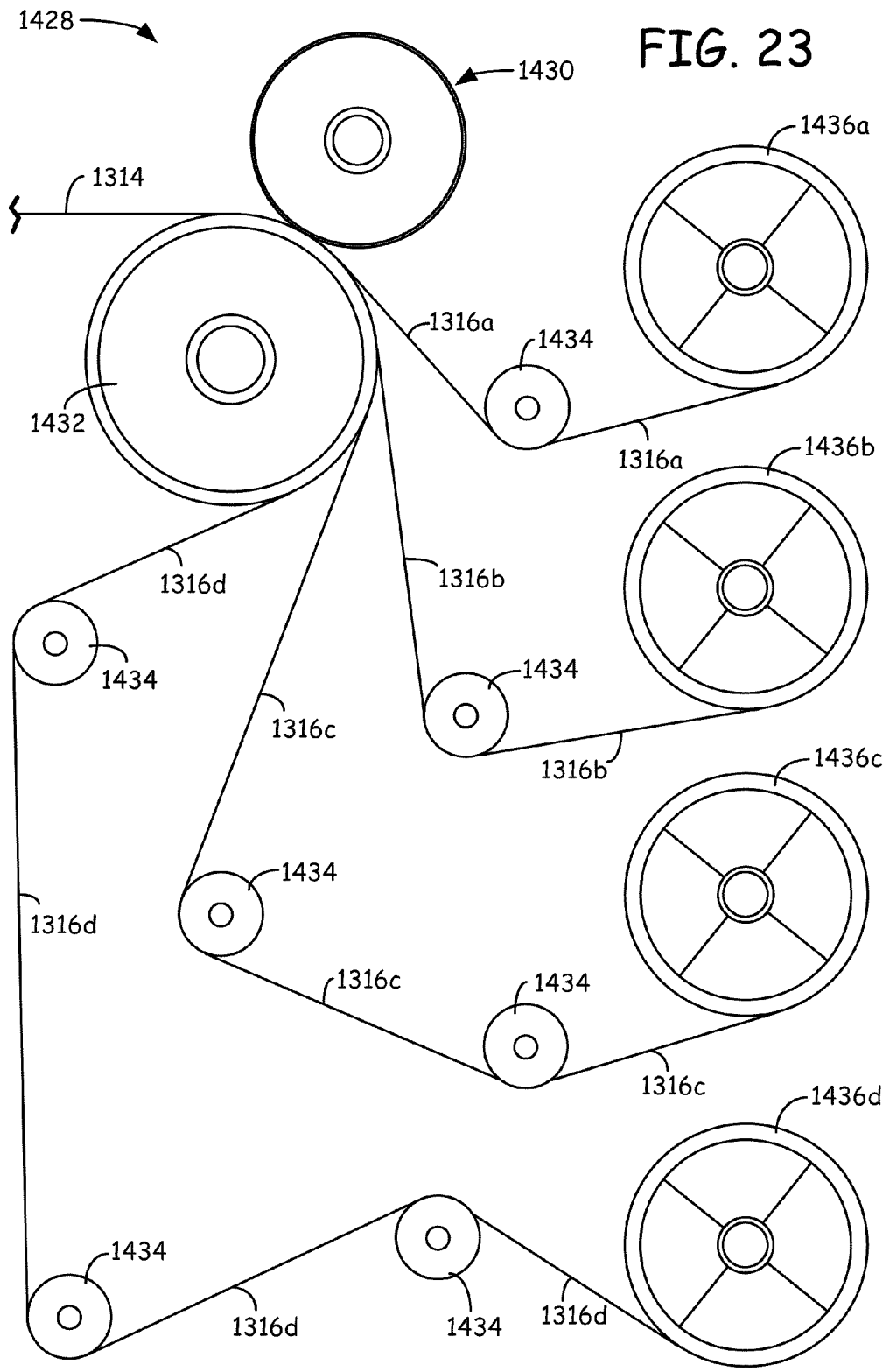
FIG. 23 is a schematic illustration of a filament-production system for forming ribbon filaments from the extruded sheets.

FIG. 23 is a schematic illustration of filament-production system 1428, which is a suitable system for forming ribbon filaments 1316 from sheet 1314. System 1428 includes cutting roller 1430, backing roller 1432, idler pulleys 1434, and take-up spools 1436a-1436d. As shown, sheet 1314 may be supplied to the nip intersection of cutting roller 1430 and backing roller 1432 from a take-up spool (e.g., take-up spool 1412) or as a direct feed from system 1400 for a continuous process.

Cutting roller 1430 is a first roller that includes a cylindrical surface having a plurality of parallel thin blades configured to cut successive portions of sheet 1314 into separate ribbon filaments (referred to as ribbon filaments 1316a-1316d). Accordingly, the parallel blades of cutting roller 1430 are desirably separated by gaps that account for the widths of ribbon filaments 1316 (e.g., width 648w of ribbon filament 634, shown in FIG. 13). Cutting roller 1430 is also desirably motor driven to pull sheet 1314 between cutting roller 1430 and backing roller 1432 during the cutting operation. Backing roller 1432 is a second roller that is spaced apart from cutting roller 1430 by a suitable distance to allow sheet 1314 to pass between cutting roller 1430 and backing roller 1432 and engage with the bladed surface of cutting roller 1430.

After being cut from sheet 1314, each ribbon filament 1316 (e.g., ribbon filaments 1316a-1316d) is desirably fed to a separate spool of take-up spools 1436a-1436d. Take-up spool 1436a-1436d are examples of suitable supply assemblies for supply spool 20 and/or supply spool 22 (shown in FIG. 1). Ribbon filaments 1316a-1316d may be directed to the respective take-up spools 1436a-1436d with idler pulleys 1434. As shown, idler pulleys 1434 are positioned to allow ribbon filaments 1316a-1316d to exit backing roller 1432 at different radial locations. This reduces the risk of ribbon filaments 1316a-1316d from becoming entangled while being loaded to take-up spools 1436a-1436d.

Each of take-up spools 1436a-1436d may also be motor driven to respectively wind up ribbon filaments 1316a-1316d as they are cut from sheet 1314. While system 1428 is illustrated with four ribbon filaments 1316 and four take-up spools 1436, cutting roller 1430 may cut sheet 1314 into any suitable number of ribbon filaments 1316, based on the widths of sheet 1314 and ribbon filaments 1316. The cut ribbon filament 1316 may then be loaded onto individual take-up spools 1436 in a substantially parallel manner.

While system 1428 is shown with a single cutting roller 1430/backing roller 1432 pair, in alternative embodiments, system 1428 may include multiple pairs of cutting rollers/backing rollers. For example, system 1428 may include an initial pair of cutting roller 1430 and backing roller 1432, which may cut sheet 1314 into multiple segments, where each segment has a width that includes multiple ribbon filaments 1316. Each cut segment may then pass through an additional pair of cutting roller 1430 and backing roller 1432, which may cut the given segment into the separate ribbon filaments 1316. The separate ribbon filaments 1316 may then be loaded onto separate take-up spools 1436, as discussed above. Thus, sheet 1314 may be cut into ribbon filaments 1316 during a single cutting step or in multiple successive cutting steps.

Sheet extrusion system 1400 and filament-production system 1428 are each desirably contained within a housing (not shown) to achieve a dry environment. For example, systems 1400 and 1428 may each include a dry air circulator and/or desiccant packages to maintain the low moisture content. Furthermore, take-up spools 1412 and 1436 may each also include desiccant packages to keep the received sheet 1314/ribbon filament 1316 dry during storage and subsequent use. Suitable techniques for maintaining dry environments in systems 1400 and 1428, and in take-up spools 1412 and 1436 include those disclosed in Swanson et al., U.S. Pat. No. 6,923,634; Comb et al., U.S. Pat. No. 7,122,246; and Taatjes et al, U.S. Patent Application Publication Nos. 2010/0096489 and 2010/0096485.

The above-discussed embodiments of the consumable materials of the present disclosure (e.g., cylindrical and non-cylindrical filaments) illustrate the variety of topographical surface patterns that may be used to allow filament drive mechanisms to apply axial pressures. As discussed above, the axial pressures drive successive portions of the consumable materials downward without inducing sliding friction between the filament drive mechanism and the consumable material. As a result, the consumable materials having topographical surface patterns are suitable for building 3D models and support structures with increased process reliability and part quality.

There are a variety of distinguishable ways that an otherwise translationally symmetric filament can be patterned so that an external force can more readily gain purchase on a filament (e.g., filament 36 and ribbon filament 636) to axially impel the filament into and/or through a liquefier (e.g., liquefier 62). The pattern can be spatially periodic, quasi-periodic, or random, and may affect a small or large fraction of the exterior surface. Furthermore, the local surface normals can vary from a few degrees from the plane normal to the longitudinal axis (e.g., axis 46) up to 90 degrees from the plane.

In additional embodiments of the present disclosure, the above-discussed cylindrical and non-cylindrical filaments may also be hollow. Since the cross-sectional area of the plastic is reduced by the missing core, the hydraulic diameter of the hollow filament may also be less than the physical diameter. Accordingly, examples of suitable hydraulic diameters for the hollow filaments of the present disclosure include those discussed above. Furthermore, the liquefier may also include a mating core to the hollow filament, so that the extrudate is heated from the inside as well as the outside.

One potential additional advantage of a hollow filament is that when hollow filament is manufactured by rapid extrusion from a compounder, it is desirably rapidly cooled before it is retained on a supply assembly (e.g., spooled). That rapid cooling process may induce diameter changes in an otherwise solid filament that may vary along its length. In comparison, if a hollow filament is rapidly cooled, the inner surface of the hollow filament can vary in diameter, leaving the outer surface more uniform.

Another potential additional advantage of a hollow filament in the form of a cylindrical shell is compliance with the filament drive mechanism. A solid filament may be close to incompressible, so that a drive roller or drive teeth may obtain too little or too much traction if the filament diameter is slightly small or large. A hollow filament, however, provides compliance so that small variations in the filament diameter are compensated by variations in the amount of compression of the hollow filament.

Yet another potential additional advantage of a hollow filament is the reduced thermal conduction in the inlet of the liquefier. When a solid filament is stationary, heat may slowly conduct up the center of the filament to the zone above the heated portion of the liquefier where the walls are relatively cool. If the filament melts there, it tends to solidify against the cooler wall, potentially causing a large axial force to restart filament motion. The rate of heat conduction up a hollow filament, however, will be slower than the rate of conduction up a solid filament due to the lack of a core.

Although the present invention has been described with reference to preferred embodiments, workers skilled in the art will recognize that changes may be made in form and detail without departing from the spirit and scope of the invention.

The invention claimed is:

1. A method for building a three-dimensional model in an extrusion-based digital manufacturing system, the method comprising:
   providing a consumable filament to the extrusion-based digital manufacturing system, the consumable filament having a length, an exterior surface, and a plurality of tracks along at least a portion of the length, wherein the plurality of tracks provide a fractal dimensionality for at least a portion of the exterior surface that is greater than two for a length scale between 0.01 millimeters and 1.0 millimeter;
   engaging teeth of a rotatable drive mechanism retained by the extrusion-based digital manufacturing system with the plurality of tracks of the consumable filament;
   feeding successive portions of the consumable filament with the rotatable drive mechanism to a liquefier retained by the extrusion-based digital manufacturing system, wherein successive teeth of the rotatable drive mechanism are continuously engaged with successive tracks of the plurality of tracks while feeding the successive portions of the consumable filament;
   melting the consumable filament in the liquefier to provide a melted consumable material;
   extruding the melted consumable material from the liquefier; and
   depositing the extruded consumable material in a layer-by-layer manner to form at least a portion of the three-dimensional model, which generates back pressure in the liquefier.

2. The method of claim 1, wherein the consumable filament has a substantially cylindrical geometry with an average diameter ranging from about 1.143 millimeters to about 2.54 millimeters.

3. The method of claim 1, wherein the consumable filament has a substantially rectangular cross-sectional profile.

4. The method of claim 1, wherein the plurality of tracks are selected from the group consisting of rectangular tracks, parabolic tracks, worm-type tracks, corrugated tracks, textured tracks, impressed file-type tracks, herringbone-type tracks, sprocket tracks, edge-facing tracks, staggered tracks, and combinations thereof.

5. The method of claim 1, wherein the consumable filament compositionally comprises at least one material selected from the group consisting of a thermoplastic material, an amorphous metallic alloy, and combinations thereof.

6. The method of claim 1, wherein providing the consumable filament to the extrusion-based digital manufacturing system comprises subjecting the consumable filament to a curved pathway in the extrusion-based digital manufacturing system, wherein the consumable filament exhibits a flexibility configured to withstand an elastic strain of t/r, wherein t is a cross-sectional thickness of the consumable filament in a plane of curvature at the curved pathway, and wherein r is a bend radius that the consumable filament is subjected to at the curved pathway.

7. The method of claim 1, and further comprising reversing operation of the rotatable drive mechanism to withdraw the consumable filament from the liquefier.

8. The method of claim 1, wherein the plurality of tracks have an average cross-sectional area that is at least about 5% of an average cross-sectional area of the consumable filament at a non-track location.

9. The method of claim 1, wherein feeding the successive portions of the consumable filament with the rotatable drive mechanism comprises applying axial pressure to the consumable filament with the teeth of the rotatable drive mechanism.

10. A method for building a three-dimensional model in an extrusion-based digital manufacturing system, the method comprising:
   providing a consumable filament to the extrusion-based digital manufacturing system, the consumable filament having a length, an exterior surface, and a plurality of tracks indented from the exterior surface, the plurality of tracks extending along at least a portion of the length, wherein each of the plurality of tracks has an average cross-sectional area that ranges from about 5% to about 30% of an average cross-sectional area of the consumable filament at a non-track location;
   feeding successive portions of the consumable filament to a liquefier retained by the extrusion-based digital manufacturing system with teeth of a rotatable drive mechanism engaged with the plurality of tracks, wherein successive teeth of the rotatable drive mechanism are continuously engaged with successive tracks of the plurality of tracks while feeding the successive portions of the consumable filament;
   melting the consumable filament in the liquefier to provide a melted material;
   extruding the melted material from the liquefier; and
   depositing the extruded material in a layer-by-layer manner to form at least a portion of the three-dimensional model, which generates back pressure in the liquefier.

11. The method of claim 10, wherein the consumable filament has a substantially cylindrical geometry with an average diameter ranging from about 1.143 millimeters to about 2.54 millimeters.

12. The method of claim 10, wherein providing the consumable filament to the extrusion-based digital manufacturing system comprises subjecting the consumable filament to a curved pathway in the extrusion-based digital manufacturing system, wherein the consumable filament exhibits a flexibility configured to withstand an elastic strain of t/r, wherein t is a cross-sectional thickness of the consumable filament in a plane of curvature at the curved pathway, and wherein r is a bend radius that the consumable filament is subjected to at the curved pathway.

13. The method of claim 10, wherein the consumable filament has a substantially rectangular cross-sectional profile.

14. The method of claim 13, and further comprising reversing operation of the drive mechanism to withdraw the consumable filament from the liquefier.

15. A method for building a three-dimensional model in an extrusion-based digital manufacturing system, the method comprising:
   providing a consumable filament to the extrusion-based digital manufacturing system, the consumable filament having a length, an exterior surface, and a plurality of tracks indented from the exterior surface, the plurality of tracks extending along at least a portion of the length, wherein each of the plurality of tracks has an average cross-sectional area that ranges from about 5% to about 30% of an average cross-sectional area of the consumable filament at a non-track location;
   directing the consumable filament through a filament pathway to an extrusion head retained by the extrusion-based digital manufacturing system, wherein at least a portion of the filament pathway comprises a curved pathway, wherein the consumable filament exhibits a flexibility configured to withstand an elastic strain of t/r, wherein t is a cross-sectional thickness of the consumable material in a plane of curvature at the curved pathway, and wherein r is a bend radius that the consumable filament is subjected to at the curved pathway; and feeding successive portions of the consumable filament to a liquefier of the extrusion head with teeth of a rotatable drive mechanism of the extrusion head that is engaged with at least a portion of the plurality of tracks, wherein successive teeth of the rotatable drive mechanism are continuously engaged with successive tracks of the plurality of tracks while feeding the successive portions of the consumable filament.

16. The method of claim 15, wherein the consumable filament compositionally comprises at least one material selected from the group consisting of a thermoplastic material, an amorphous metallic alloy, and combinations thereof.

17. The method of claim 15, wherein the consumable filament has a substantially rectangular cross-sectional profile.

18. The method of claim 15, wherein the plurality of tracks are selected from the group consisting of rectangular tracks, parabolic tracks, worm-type tracks, corrugated tracks, textured tracks, impressed file-type tracks, herringbone-type tracks, sprocket tracks, edge-facing tracks, staggered tracks, and combinations thereof.

19. The method of claim 15, and further comprising reversing operation of the drive mechanism to withdraw the ribbon filament from the liquefier.

20. The method of claim 15, and further comprising:
melting the consumable filament in the liquefier to provide a melted material;
extruding the melted material from the liquefier; and
depositing the extruded material in a layer-by-layer manner to form at least a portion of the three-dimensional model, which generates back pressure in the liquefier.

* * * * *